(12) United States Patent
Takemoto et al.

(10) Patent No.: US 6,941,179 B2
(45) Date of Patent: Sep. 6, 2005

(54) DEVICE CONTROL SYSTEM, NETWORK CONSTRUCTED BY THE SYSTEM, AND PROGRAM EXECUTED ON DEVICE CONSTRUCTING THE SYSTEM

(75) Inventors: Takahiro Takemoto, Higashihiroshima (JP); Naohisa Motomura, Higashihiroshima (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 338 days.

(21) Appl. No.: 10/404,133

(22) Filed: Apr. 2, 2003

(65) Prior Publication Data

US 2003/0192042 A1 Oct. 9, 2003

(30) Foreign Application Priority Data

Apr. 4, 2002 (JP) .................................. 2002-102581

(51) Int. Cl.[7] .............................................. G05B 19/42
(52) U.S. Cl. ..................... 700/87; 700/163; 700/112; 717/177; 709/200; 710/1
(58) Field of Search ............................. 700/2, 9, 23, 28, 700/87, 112, 169, 83, 79; 717/177; 710/1; 709/200, 223

(56) References Cited

U.S. PATENT DOCUMENTS

2002/0083168 A1 * 6/2002 Sweeny et al. ............. 709/224
2002/0152307 A1 * 10/2002 Doyle et al. ................ 709/225

FOREIGN PATENT DOCUMENTS

| JP | 10-214243 | 8/1998 |
| JP | 10-301884 | 11/1998 |
| JP | 2002-183001 | 6/2002 |

* cited by examiner

Primary Examiner—Kidest Bahta
(74) Attorney, Agent, or Firm—Wenderoth, Lind & Ponack, L.L.P.

(57) ABSTRACT

A device control system is provided, in which a host device uploads optimal program code suitable for its own system environment from a target device for control. In the target device 2, a plurality of pieces of program code 231 through 23n used for different system environments and a header object 221 associated with the respective pieces of program code are stored in advance. The host device 1 obtains the header object 221 from the target device 2, and then parses the obtained header object 221 to determine program code 23x (x is one of 1 through n) optimal for its own system environment. The host device 1 then uploads the determined program code 23x from the target device 2 for interpretation, thereby controlling the target device 2.

18 Claims, 21 Drawing Sheets

F I G. 3

| | MEMORY SIZE | MULTIDIMENSIONAL ARRAY | JNI | AWT | CLASS LOADER | GARBAGE COLLECTION | Clone | Thread | DATA TYPE | | | | | | | | | |
|---|---|---|---|---|---|---|---|---|---|---|---|---|---|---|---|---|---|---|
| | | | | | | | | | byte | boolean | short | char | int | long | float | double | string |
| CVM | 256KB OR MORE | ○ | ○ | ○ | ○ | ○ | ○ | ○ | ○ | ○ | ○ | ○ | ○ | ○ | ○ | ○ | ○ |
| KVM | 160KB ~ 512KB | × | × | × | × | ○ | ○ | ○ | ○ | ○ | ○ | ○ | ○ | × | × | × | × |
| CardVM | 512B | × | × | × | × | × | × | × | ○ | ○ | ○ | × | ○ | × | × | × | × |

F I G. 7

EXAMPLE CLASSIFICATION BY DEVICE SPECS

| | | Mandatory | | | Recommendable | | |
|---|---|---|---|---|---|---|---|
| | LANGUAGE | CPU (MHz) | MEMORY (MB) | GRAPHICS (THE NUMBER OF COLORS) | CPU (MHz) | MEMORY (MB) | GRAPHICS (THE NUMBER OF COLORS) |
| CASE A | Japanese | 200 | 32 | 32000 | 400 | 64 | 65535 |
| CASE B | English | 100 | 16 | 4096 | 200 | 32 | 32000 |
| CASE C | Japanese | 60 | 8 | 256 | 100 | 16 | 4096 |
| CASE D | English | 60 | 4 | 16 | 80 | 8 | 256 |

FIG. 8A

PROGRAM CODE STORAGE UNIT

| 0x01 | PROGRAM CODE FOR CASE A | 231 |
| 0x02 | PROGRAM CODE FOR CASE B | 232 |
| 0x03 | PROGRAM CODE FOR CASE C | 233 |
| 0x04 | PROGRAM CODE FOR CASE D | 234 |

FIG. 8B

PROGRAM CODE MANAGING UNIT

| LANGUAGE | Mandatory | | | Recommendable | | | STORAGE ADDRESS |
|---|---|---|---|---|---|---|---|
| | CPU | MEMORY | GF | CPU | MEMORY | GF | |
| Japanese | 200 | 32 | 32000 | 400 | 64 | 65535 | 0x01 |
| English | 100 | 16 | 4096 | 200 | 32 | 32000 | 0x02 |
| Japanese | 60 | 8 | 256 | 100 | 16 | 4096 | 0x03 |
| English | 60 | 4 | 16 | 80 | 8 | 256 | 0x04 |

221

PROGRAM CODE STORAGE UNIT

PROGRAM CODE MANAGING UNIT

| SUPPORTED SYSTEM ENVIRONMENT | DATA SIZE | STORAGE ADDRESS |
|---|---|---|
| CVM | 120KB | 0x01 |
| | 90KB | 0x02 |
| KVM | 100KB | 0x03 |
| | 70KB | 0x04 |
| CardVM | 60KB | 0x05 |
| | 30KB | 0x06 |

DEVICE CONTROL SYSTEM, NETWORK CONSTRUCTED BY THE SYSTEM, AND PROGRAM EXECUTED ON DEVICE CONSTRUCTING THE SYSTEM

BACKGROUND OF THE INVENTION

1. Field of the Invention

The present invention relates to a device control system, a network constructed by the system, and a program executed on a device constructing the system. More particularly, the present invention relates to a device control system in which a controlling host device and a target device to be controlled are connected to each other and, in accordance with its own system environment, the host device uploads optimal program code required for controlling the target device. The present invention further particularly relates to a network constructed by the above device control system, and a program executed on the host device and the target device constructing the device control system.

2. Description of the Background Art

In recent years, various types of AV devices and information terminal devices have been manufactured for home use. In accordance with this recent trend, techniques for connecting a plurality of devices placed at home to one another and controlling them from one another have established. For example, with the use of such techniques, a television receiver and a videocassette recorder (VCR) are connected to each other for enabling a control of the VCR through a screen of the television receiver. One such technology is HAVi (Home Audio/Video interoperability), which is detailed in "The HAVi Specification Version 1.0" by the HAVi Organization. Also, there is another technology for connecting a personal computer, a printer, a scanner, etc., to one another to automatically construct a network. This technology is typified by Jini, which is detailed in "Jini Technology Specific Attachment v1.0" by Sun Microsystems, Inc.

The above-mentioned techniques generally employ the following scheme. A device to be controlled (hereinafter referred to as a target device) stores in advance program code that describes information required for it own control (control code). Under HAVi specifications, for example, program code using API (Application Program Interface) is stored. A controlling device (hereinafter referred to as a host device) uploads the program code for interpretation, thereby performing a process of controlling the target device and other processes.

With the use of the above-described scheme, the host device can control the target device even without knowing in advance how to control the target device. Therefore, it is possible to connect devices to one another for control regardless of manufacturer.

In general, systems configured with the above-mentioned technologies assume that a plurality of host devices and a plurality of target devices are connected to one another.

Here, consider a case in which each target device holds a single piece of program code for control of it own all functions of its own. In this case, in order for each host device to be capable of controlling all target devices, an advanced system environment is required for each host device so as to fully support the program code of every target device. As a result, each host device disadvantageously becomes expensive.

To get around the above disadvantage, consider a case in which the host devices are provided with different system environments according to capability. In this case, in order for each host device to be capable of controlling all target devices, each target device stores in advance a plurality of pieces of program code in accordance with the system environments of the host devices. Of these pieces of program code, the host device uploads program code optimal to its system environment.

One conventional technology associated with the above-stated process of uploading optimal program code is disclosed in Japanese Patent Laid-Open Publication No. 10-214243 (1998-214243), although not directly related to the above-discussed device control.

In this conventional technology, a driver software program is exchanged between a device (a printer, for example) and a device controller (a personal computer, for example). Specifically, a plurality of driver software programs are stored in advance at the device side correspondingly to different operating systems (OS) installed in connectable device controllers. Then, one device controller uploads a driver software program optimal to the controller's OS. Thus, it is possible to always upload an optimal driver software program from the device to the device controller.

In the above conventional technology, what is uploaded is a driver software program, which does not take up much free space of the memory of the device controller. Moreover, only a single driver software program corresponds to a single OS installed in each device controller (that is, each host device). Therefore, only by determining the OS (the system environment) of the host device, an optimal driver software program can be uniquely determined.

In a case where what is uploaded is program code that takes up a large amount of free space, however, what should be considered is the system environment of the host device, such as its OS, CPU, and cache memory, as well as the free space in a memory area for storing the program code. That is, the free space in the memory area of the host device is varied in accordance with how applications and other data use the memory area. Therefore, it is desirable to determine the state of each host device in comprehensive consideration of its system environment and the free space in the memory area for uploading. Based on the determination results, which program code should be uploaded is determined.

Therefore, merely applying the above conventional scheme to a device control cannot achieve uploading of optimal program code further in consideration of the change in state of the host device.

Furthermore, when the driver software program is to be uploaded, each host device merely uploads the relevant driver software program without any relation to the other host devices connected to the same network.

When the program code is to be uploaded, however, a relation to the other host devices connected to the same network matters. If the state of connection of the other host devices to the network and the program code already uploaded are taken into consideration, a larger variety of uploading schemes and device controlling schemes can be achieved.

SUMMARY OF THE INVENTION

Therefore, an object of the present invention to provide a device control system, a network constructed by the system, and a program executed on a device constructing the system. In the device control system, a plurality of pieces of program code used under different system environments are stored in a target device. A host device determines its own system environment, the free space in the memory area, and further the state of connection of the other host devices to the network. Then, the host device uploads optimal program code from the target device and controls the target device.

The present invention has the following features to attain the object mentioned above.

A first aspect of the present invention is directed to a device control system in which at least one host device and at least one target device are connected to each other via a communications network.

In the device control system according to the first aspect, the target device includes: a storage unit operable to store a plurality of pieces of program code required for control of the target device; and a managing unit operable to manage program code information associated with the pieces of program code. Here, the pieces of program code stored in the storage unit correspond to possible system environments of the host device. Also, two or more pieces of program code of different data sizes correspond to at least one of the possible system environments.

The host device includes: an obtaining unit operable to obtain the program code information from the target device; a predetermined memory area operable to store one of the pieces of program code; an information parser for checking a system environment of the host device and a free space in the memory area, parsing the program code information, and determining, from out of the pieces of program code stored in the target device, a piece of program code that is suitable for the system environment and is storable in the memory area; a reading unit operable to read the piece of program code determined by the information parser from the target device, and to cause the read piece of program code to be stored in the memory area; and a controller for controlling the target device by using the piece of program code stored in the memory area.

According to the first aspect, a plurality of pieces of program code are previously stored in the target device. Of these pieces of program code, the host device determines a piece of program code optimal to its own system environment, and then automatically uploads the determined program code from the target device. With this, it is possible to determine the suitable program code in further consideration of the dynamically-variable memory area of the host device. Also, since the plurality of pieces of program code are provided to the target device, it is enough for the host device to be provided with a system environment complying only with its own functions and capabilities. Furthermore, not only high-spec devices, such as television receivers or STBs, but also low-spec devices, such as PDAs or cellular phones, can be utilized as a host device. Still further, since the optimal program code is automatically determined at the host device side, the user does not have to determine the optimal program code by himself or herself taking trouble to check the OS or specifications of his or her device.

In the first aspect, when a plurality of said host devices include a host device serving as a main host device operable to control at least an arbitrary one of a plurality of said target devices, and further include at least one host device connected to the target device to e controlled via the communications network, the following schemes are preferably carried out.

In a first scheme, the information parser is operable to check memory areas of the plurality of said host devices excluding the main host device. In the main host device, the information parser first checks the memory area of the at least one host device connected to the target device to determine whether any of the at least one host device connected to the target device stores at least one piece of program code that corresponds to the system environment of the main host device, and designates any of the at least one host device connected to the target device found to store at least one piece of program code that corresponds to the system environment of the main host device as a first sub-host device. The information parser designates, as the piece of program code that is suitable for the system environment of the main host device, a unique piece of program code that is determined based on the at least one piece of program code stored in the memory area of the first sub-host device.

According to the first scheme, for the purpose of performing a device control, one host device determines optimal program code to be uploaded from the target device by further taking in consideration the state of program code stored in another host device connected to the same network. With this, it is possible to perform a specific control with a plurality of host devices having a specific relation to each other (refer to the third embodiment).

In a second scheme, the information parser is operable to check memory areas of the plurality of said host devices excluding the main host device. The controller further obtains command information enabling an operation of a piece of program code stored in any of the at least one host device connected to the target device and to give a command based on the command information. In the main host device, when the pieces of program code stored in the target device do not include a piece of program code that is suitable for the system environment of the main host device and is storable in a memory area of the main host device, the information parser further checks the memory area of any of the at least one host device connected to the target device to determine whether any of the at least one host device connected to the target device stores at least one piece of program code that corresponds to the system environment of the main host device, and designates any of the at least one host device found to store at least one piece of program code that corresponds to the system environment of the main host device as a first sub-host device. The controller obtains the command information from the first sub-host device and gives the command to the first sub-host device based on the command information. In response to the command given by the main host device, the controller of the first sub-host device controls the target device by using the piece of program code stored in a memory area of the first sub-host device.

According to the second scheme, in order for one host device to perform a device control, it is determined whether the optimal program code should be uploaded by further taking in consideration the state of program code stored in another host device connected via the same communications network. With this, even when the free space in the memory area of the host device is smaller than the data size of the program code suitable for the system environment that is the smallest, it is possible to control the target device via the other host device.

A third scheme is used when the information parser determines in the second scheme that any of the at least one host device connected to the target device does not store at least one piece of program code that corresponds to the system environment of the main host device.

In the main host device, the information parser checks a free space of the memory area of the at least one host device connected to the target device to determine whether any of the at least one host device connected to the target device has a memory area in which at least one piece of program code that corresponds to the system environment of the main host device is storable, and designates any of the at least one host device connected to the target device found to have the memory area in which at least one host device connected to the target device as a second sub-host device. The information parser further designates, as the piece of program code that is suitable for the system environment of the main host device, a piece of program code that corresponds to the system environment of the main host device and is storable in the memory area of the second sub-host device. In response, the reading unit gives the second sub-host device an instruction of reading the piece of program code determined by the information parser.

Next, in response to the instruction given by the main host device, the reading unit of the second sub-host device reads the piece of program code from the target device, and stores the read piece of program code in the memory area of the second sub-host device.

Next, the controller of the main host device obtains command information from the second sub-host device, and gives a command to the second sub-host device based on the command information.

Then, in response to the command given by the main host device, the controller of the second sub-host device controls the target device by using the piece of program code stored in the memory area of the second sub-host device.

According to the third scheme, in order for one host device to perform a device control, it is determined whether the optimal program code should be uploaded from the target device to the host device or another host device, based on the state of program code stored in another host device connected to the same network and the free space in their memory areas. With this, even when the free space in the memory area of the host device is smaller than the data size of the program code suitable for the system environment that is the smallest, it is possible to control the target device via the other host device.

A second aspect of the present invention is directed to a device control system in which at least one host device and at least one target device are connected to each other via a communications network.

In the device control system according to the second aspect, the target device includes: a storage unit operable to store a plurality of pieces of program code required for control of the target device; a managing unit operable to manage program code information associated with the pieces of program code; an obtaining unit operable to obtain, from the host device, device information of the host device including information associated with a system environment and a free space of a predetermined memory area; an information parser for parsing the device information and the program code information, and determining, from out of the pieces of program code, a piece of program code that is suitable for the system environment of the host device and is storable in the memory area of the host device; and a reporting unit operable to report the piece of program code determined by the information parser to the host device. Here, the pieces of program code stored in the storage unit correspond to possible system environments of the host device. Also, two or more pieces of program code of different data sizes correspond to at least one of the possible system environments.

The host device includes: an information managing unit operable to manage the device information; a reading unit operable to read the piece of program code reported by the reporting unit from the target device, and to cause the read piece of program code to be stored in the memory area; and a controller for controlling the target device by using the piece of program code stored in the memory area.

According to the second aspect, a plurality of pieces of program code are provided in advance to the target device. Of these pieces of program code, the target device determines optimal program code suitable for the system environment of the host device and the free space of the memory area thereof. Based on the determination result, the host device then automatically uploads the determined program code. With this, not only high-spec devices, such as television receivers or STBs, but also low-spec devices, such as PDAs or cellular phones, can be utilized as a host device. Also, a function for determining program code is not required at the host device side. Therefore, cost reduction of the host device can be achieved.

A third aspect of the present invention is directed to a network constructed by at least one device control system in which a plurality of devices are connected to each other via a communications network.

In the device control system according to the third aspect, each of the plurality of devices is operable to serve as a host device operable to control another one of the devices and as a target device to be controlled by another one of the devices.

Also, each of the devices includes, as the target device: a storage unit operable to store a plurality of pieces of program code required for control of the target device; and a managing unit operable to manage program code information associated with the pieces of program code. Here, the pieces of program code stored in the storage unit correspond to possible system environments of the host device. Also, two or more pieces of program code of different data sizes correspond to at least one of the possible system environments.

Furthermore, each of the devices includes, as the host device: an obtaining unit operable to obtain the program code information from the target device; a predetermined memory area operable to store one of the pieces of program code; an information parser for checking a system environment of the host device and a free space in the memory area, parsing the program code information, and determining, from out of the pieces of program code stored in the target device, a piece of program code that is suitable for the system environment and is storable in the memory area; a reading unit operable to read the piece of program code determined by the information parser from the target device, and to cause the read piece of program code to be stored in the memory area; and a controller for controlling the target device by using the piece of program code stored in the memory area.

A fourth aspect of the present invention is directed to a network constructed by at least one device control system in which a plurality of devices are connected to each other via a communications network.

In the device control system according to the fourth aspect, each of the plurality of devices is operable to serve as a host device operable to control another one of the devices and as a target device to be controlled by another one of the devices.

Also, in the fourth aspect, each of the devices includes, as the target device: a storage unit operable to store a plurality of pieces of program code required for control of the target device; a managing unit operable to manage program code information associated with the pieces of program code; an obtaining unit operable to obtain, from the host device, device information of the host device including information associated with a system environment and a free space of a memory area; an information parser for parsing the device information and the program code information, and determining, from out of the pieces of program code, a piece of program code that is suitable for the system environment of the host device and is storable in the memory area of the host device; and a reporting unit operable to report the piece of program code determined by the information parser to the host device. Here, the pieces of program code stored in the storage unit correspond to possible system environments of the host device, and two or more pieces of program code of different data sizes correspond to at least one of the possible system environments. Also, each of the devices includes, as the host device: an information managing unit operable to manage the device information; a reading unit operable to read the piece of program code reported by the reporting unit from the target device, and to cause the read piece of program code to be stored in the memory area; and a controller for controlling the target device by using the piece of program code stored in the memory area.

According to the third and fourth aspects, each device connected via a communications network is provided with functions so as to serve as either one of a host device and a target device. Therefore, each device can be a host device or a target device.

In the first through fourth aspects, when the possible system environments indicate virtual machines installable in the host device, the pieces of program code and the program code information are preferably generated based on types of the virtual machines.

With this, a developer of the target device describes a plurality of pieces of program code classified by possible virtual machine, possible device specs, or others. Such classification enables the developer to easily provide pieces of program code for enabling the host device under various system environments to optimally operate. Also, the host device can determine optimal program code from among the plurality of pieces of program code stored in the target device only by determining the name of the virtual machine. This can achieve reduction in cost.

Furthermore, when the possible system environments indicate possible device specs of the host device, the pieces of program code and the program code information are preferably generated based on the possible device specs.

With this, the developer of the target device can uniquely define, to some extent, conditions for executing the program code generated by the developer. Therefore, upcoming versions of the host device and the target device can be supported.

Still further, when the possible system environments indicate possible device specs of the host device, the host device preferably further includes an input unit operable to enable a user to set a condition. When the user sets the condition by using the input unit, the information parser can determine a piece of program code suitable for device specs of the host device and best matching the condition.

With this, the users of the host device and target device can also control their devices in the most desired manner.

A fifth aspect of the present invention is directed to a program executed on a main host device which is included in a plurality of host devices and is operable to control a target device via a communications network, the target device being operable to store a plurality of pieces of program code required for control of the target device and program code information associated with the pieces of program code, wherein the pieces of program code correspond to possible system environments of each of the host devices, and wherein two or more pieces of program code of different data sizes correspond to at least one of the possible system environments.

The program according to the fifth aspect causes the main host device to execute steps including: a first obtaining step of obtaining the program code information from the target device; a first determining step of determining a system environment of the main host device and a free space of a predetermined memory area of the main host device; a step of parsing the program code information; a program code determining step of determining, based on the determination result in the first determining step and the parse result in the parsing step, from out of the pieces of program code stored in the target device, a piece of program code that is suitable for the system environment of the main host device and is storable in the memory area of the main host device; a first storing step of reading the determined piece of program code from the target device, and causing the read piece of program code to be stored in the memory area of the main host device; and a first controlling step of controlling the target device by using the stored piece of program code.

In the fifth aspect, preferably, the program causes the main host device to execute steps further including a second determining step of checking a predetermined memory area of any of the host devices connected via the communications network to determine whether any of the host devices connected via the communications network stores at least one piece of program code that corresponds to the system environment of the main host device, and designating any of the host devices found to store at least one piece of program code that corresponds to the system environment of the main host device as a sub-host device. Then, the program code determining step designates, as the piece of program code that is suitable for the system environment of the main host device, a unique piece of program code that is determined based on the at least one piece of program code stored in the memory area of the sub-host device.

Furthermore, preferably, the program causes the main host device to execute steps further including: a second determining step of checking, in accordance with a determination in the program code determining step that the pieces of program code do not include a piece of program code that is suitable for the system environment of the main host device, a predetermined memory area of any of the host devices connected via the communications network to determine whether any of the host devices stores at least one piece of program code that corresponds to the system environment of the main host device, and designating any of the host devices found to store at least one piece of program code that corresponds to the system environment of the main host device as a sub-host device; a second obtaining step of obtaining command information which enables an operation of the stored piece of program code from the sub-host device; and a second controlling step of controlling the target device by giving a command to the sub-host device based on the command information.

Still preferably, the program causes the main host device to execute steps further including: a third determining step of checking, in accordance with a determination in the second determining step that any of the host devices connected to the target device does not store at least one piece of program code that corresponds to the system environment of the main host device, a free space of the memory area of any of the host devices connected to the target device to determine whether any of the host devices connected to the target device has a memory area in which at least one piece of program code that corresponds to the system environment of the main host device is storable, and designating any of the host devices connected to the target device found to have the memory area in which at least one piece of program code that corresponds to the system environment of the main host device is storable as a sub-host device; a second storing step of reading, from the target device, the piece of program code that is suitable for the system environment of the main host device, and causing the read piece of program code to be stored in the sub-host device; a third obtaining step of obtaining command information from the sub-host device; and a third controlling step of controlling the target device by giving a command to the sub-host device based on the command information.

A sixth aspect of the present invention is directed to a program executed on a target device that is controlled by a host device via a communications network, wherein the host device stores device information including information associated with a system environment and a free space of a predetermined memory area of the host device, wherein the target device is operable to store a plurality of pieces of program code required for control of the target device and program code information associated with the pieces of program code, wherein the pieces of program code correspond to possible system environments of each of the host devices, and wherein two or more pieces of program code of different data sizes correspond to at least one of the possible system environments.

The program according to the sixth aspect causes the target device to execute steps including: a step of obtaining the device information from the host device; a step of parsing the device information and the program code information; a step of determining, based on the parse result in the parsing step, from out of the pieces of program code stored in the target device, a piece of program code that is suitable for the system environment of the host device and is storable in the memory area of the host device; and a step of sending the determined piece of program code to the host device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustration exemplarily showing a list containing a memory size and restrictions at the time of execution of a Java program that are recommended by each virtual machine;

FIG. 7 is a table showing cases classified by device specifications;

FIGS. 8A and 8B are illustrations showing a header object and pieces of program code in Example 2 according to the first embodiment;

DESCRIPTION OF THE PREFERRED EMBODIMENTS

Hereinafter, a device control system provided by the present invention in which a host device controls a target device is described by taking a plurality of exemplary cases in accordance with the number of host devices connected to the network and the scheme of uploading program code from the target device.

(First Embodiment)

Figure 1:
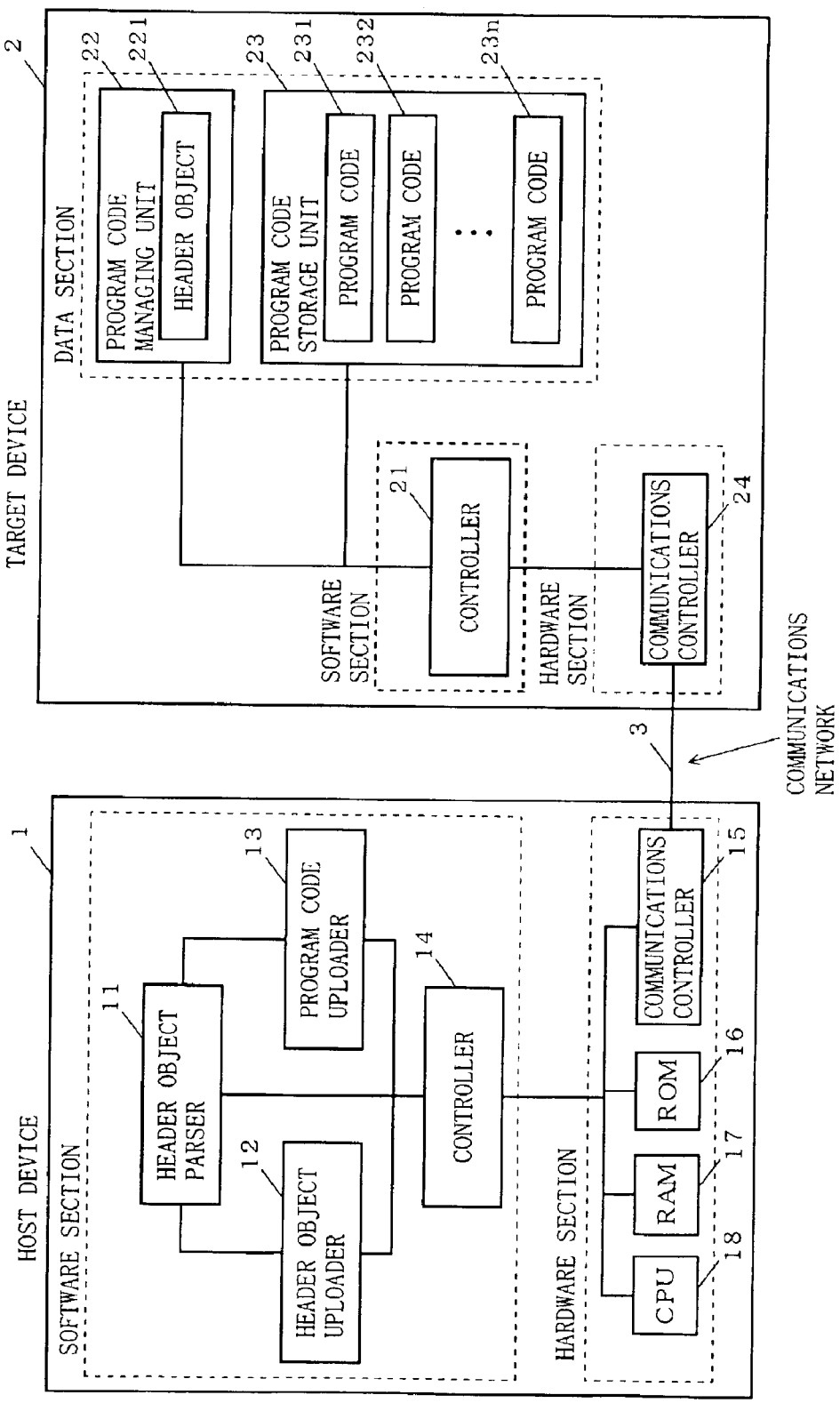
FIG. 1 is a block diagram illustrating the configuration of a device control system according to first and second embodiments of the present invention.

FIG. 1 is a block diagram illustrating the configuration of a device control system according to a first embodiment of the present invention. In FIG. 1, the device control system according to the first embodiment includes at least one host device 1 and at least one target device 2 connected to each other via a wire or wireless communications network 3.

The host device 1 includes a header object parser 11, a header object up loader 12, a program code up loader 13, a controller 14, a communications controller 15, ROM 16, RAM 17, and a CPU 18. The target device includes a controller 21, a program code managing unit 22, a program code storage unit 23, and a communications controller 24.

First, the target device 2 in the above-configured device control system according to the first embodiment is described.

The program code storage unit 23 stores a plurality of pieces of program code 231 through 23n (n is an integer of 2 or more). These pieces of program code 231 through 23n are generated in advance by a developer of the target device 2 in accordance with the system environment of the host device 1 that is known in advance to be connectable to the target device 2. The pieces of program code 231 through 23n will be described further below in detail.

The program code managing unit 22 stores a header object 221, which represents information used for managing program code. More specifically, the header object 221 includes information indicative of, for each of the pieces of program code 231 through 23n, a system environment corresponding to the relevant program code and a storage address of the relevant program code in the program code storage unit 23. The header object 221 will be described further below in detail.

Based on an instruction given by the host device 1 through the communications controller 24, the controller 21 controls a process of reading/sending the header object 221 and the program code 231 through 23n.

Figure 2:
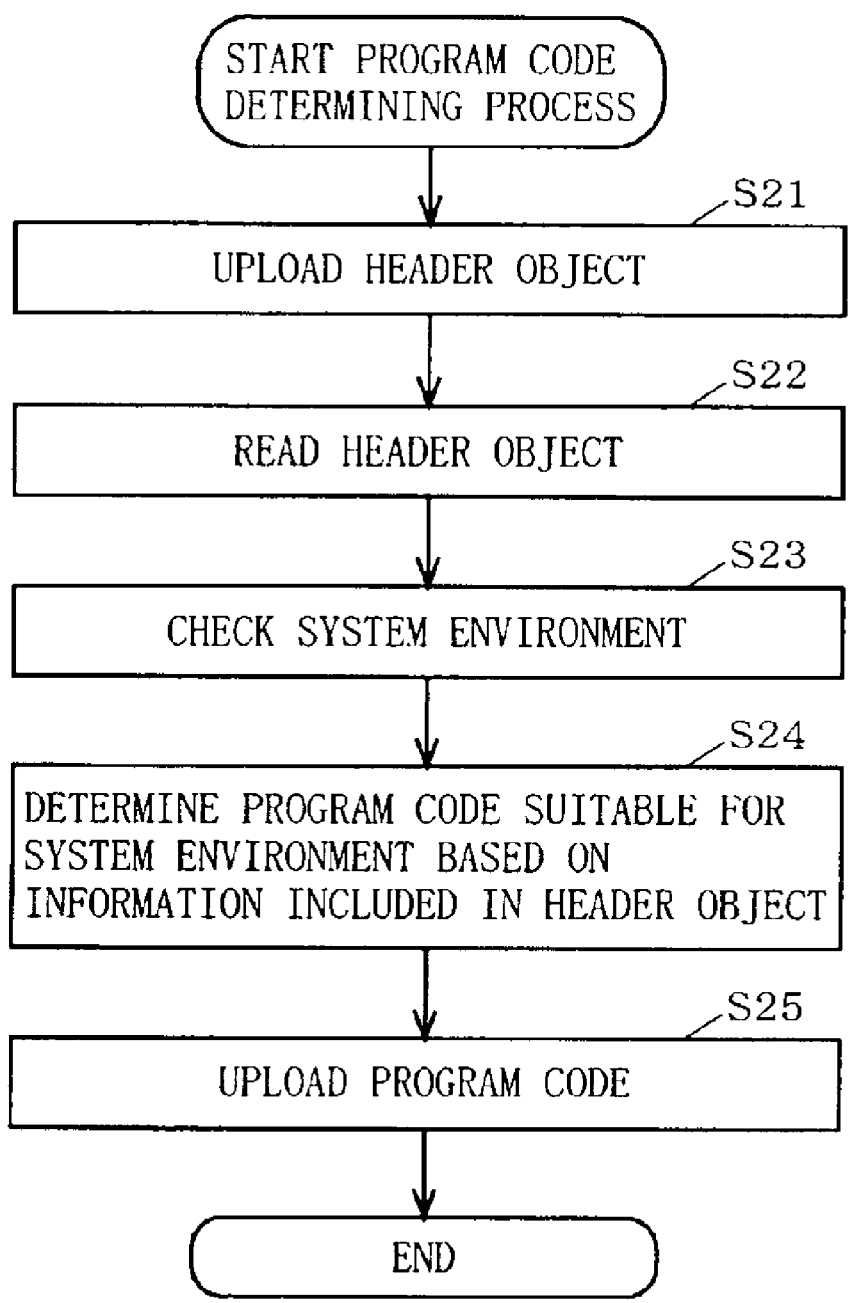
FIG. 2 is a flow chart showing the basic procedure of determining program code performed by a host device according to the first embodiment.

Next, the host device 1 of the above-configured device control system according to the first embodiment is described. FIG. 2 is a flow chart showing the basic procedure of determining program code performed by the host device 1 according to the first embodiment.

With the host device 1 and the target device 2 being connected to each other via the communications network 3 for communications, the CPU 18 and the controller 14 give predetermined instructions so as to cause the header object parser 11, the header object uploader 12, and the program code uploader 13 to perform the following processes.

First, the header object uploader 12 uploads the header object 221 stored in the program code managing unit 22 of the target device 2 to the RAM 17 via the communications controller 24, the communications network 3, and the communications controller 15 (step S21). The header object parser 11 then reads the header object 221 uploaded to the RAM 17 (step S22). The header object parser 11 then checks the system environment of the host device 1 (step S23). Then, based on the information associated with the system environment of each program code included in the header object 221, the header object parser 11 determines program code suitable for the checked system environment (step S24). Finally, the program code uploader 13 uploads the program code determined by the header object parser 11 from the program code storage unit 23 of the target device 2 via the communications controller 24, the communications network 3, and the communications controller 15 to the ROM 16 (step S25).

Upon completion of the process of uploading the program code suitable for the above system environment, the host device 1 interprets the program code stored in the ROM 16 in response to an instruction by a user so as to control the target device 2.

Further with reference to FIGS. 3 through 12, specific examples of the header object 221 stored in the program code managing unit 22 and the pieces of program code 231 through 23n stored in the program code storage unit 23 are described in connection with the system environment of the host device 1 checked by the header object parser 11.

EXAMPLE 1

A case of determining a virtual machine defined by HAVi or Jini as the system environment of the host device 1

In HAVi or Jini, program code for controlling the target device 2 is described in a Java language. Therefore, for the purpose of interpreting the program code, the host device 1 has to include a virtual machine for executing the Java code. There are several types of such virtual machine for use according to types of device to which the virtual machine is installed. Generally known examples are: CVM (C Virtual Machine) to be installed in a set-top box (STB) or a television receiver; KVM (K Virtual Machine) to be installed in a personal digital assistant (PDA) or a cellular phone; and CardVM (Card Virtual Machine) to be installed in an IC card or the like. FIG. 3 exemplarily illustrates a list containing a memory size and restrictions at the time of executing a Java program that are recommended by each virtual machine.

A plurality of pieces of program code uniquely corresponding to the respective virtual machines are generated based on the memory size and the restrictions for each virtual machine. Then, these pieces of program code are stored in advance together with a header object in the target device 2. With this, it is possible to determine the type of the virtual machine as the system environment of the host device 1.

Figure 4A:
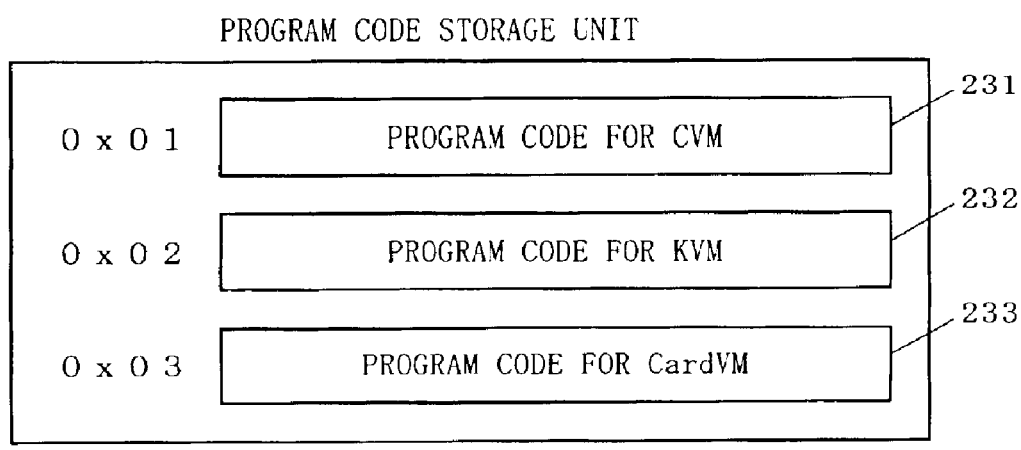
FIGS. 4A and 4B are illustrations showing a header object and pieces of program code in Example 1 according to the first embodiment.
Figure 4B:
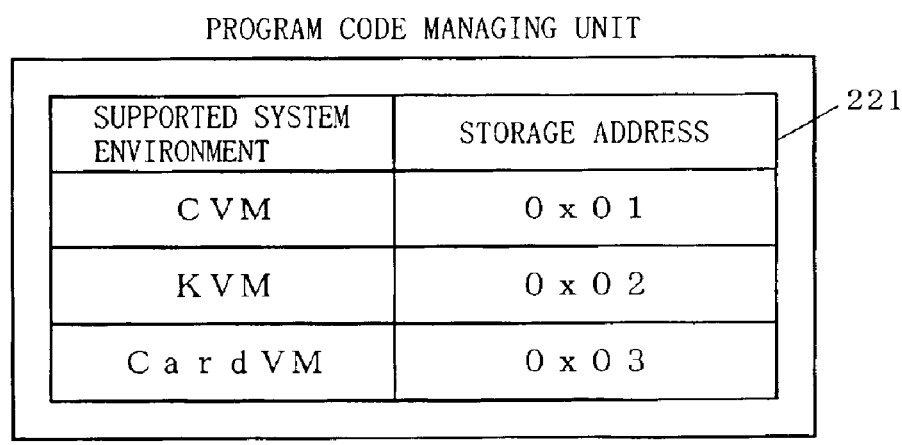

For example, program code 231 for CVM, program code 232 for KVM, and program code 233 for CardVM are generated. Then, each program code is stored in each predetermined address area in the program code storage unit 23 (FIG. 4A). The program code managing unit 22 stores a header object 221 composed of system environment information and address information (FIG. 4B). The system environment information indicates that the program code 231 corresponds to CVM, the program code 232 corresponds to KVM, and the program code 233 corresponds to CardVM. In this example, the system environment information merely describes virtual machine names. The address information indicates a storage location of each program code. Note that the number of pieces of program code and the types of virtual machine are not restricted to the above, and can be arbitrarily set.

With the use of the header object 221 and the pieces of program code 231 through 233, a process of uploading optimal program code from the target device 2 is performed by the host device 1 as follows.

Figure 5:
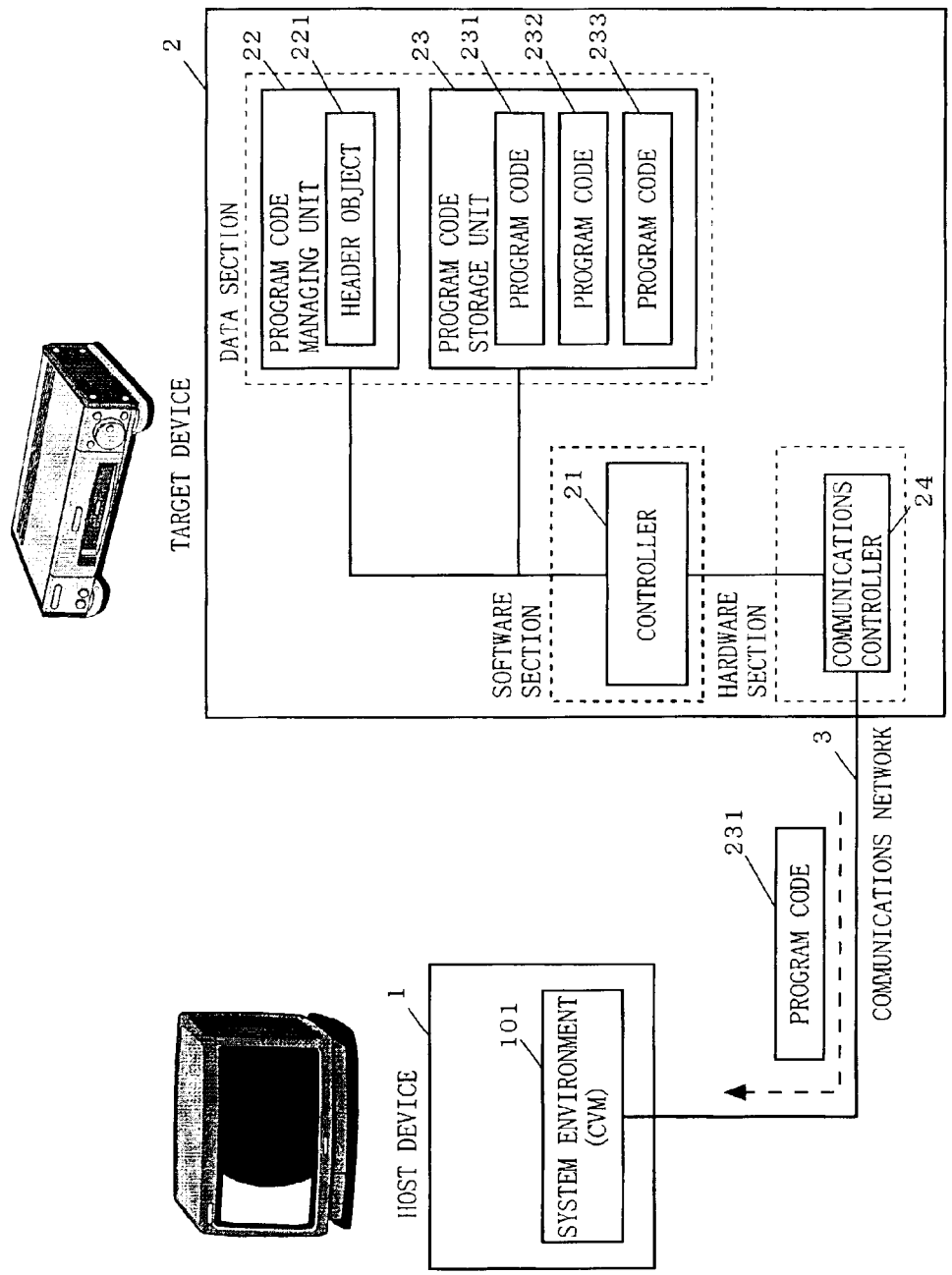
FIGS. 5 and 6 are illustrations each for describing an uploading process based on the first embodiment by taking a specific host device and a specific target device as an example.

FIG. 5 is an illustration for describing an exemplary case in which the host device 1 is a television receiver having therein a virtual machine (here, CVM) 101 installed, and the target device 2 is a VCR.

In FIG. 5, with the host device 1 and the target device 2 being connected via the communications network 3, the header object 221 is uploaded by the header object uploader 12 from the target device 2. After the header object 221 is uploaded, it is then determined by the header object parser 11 whether the system environment for the virtual machine 101, that is, the program code 231 for CVM, has been stored in the target device 2. If such program code has been stored, the program code 231 is uploaded by the program code uploader 13 from the target device 2 based on the storage address "0x01".

Figure 6:
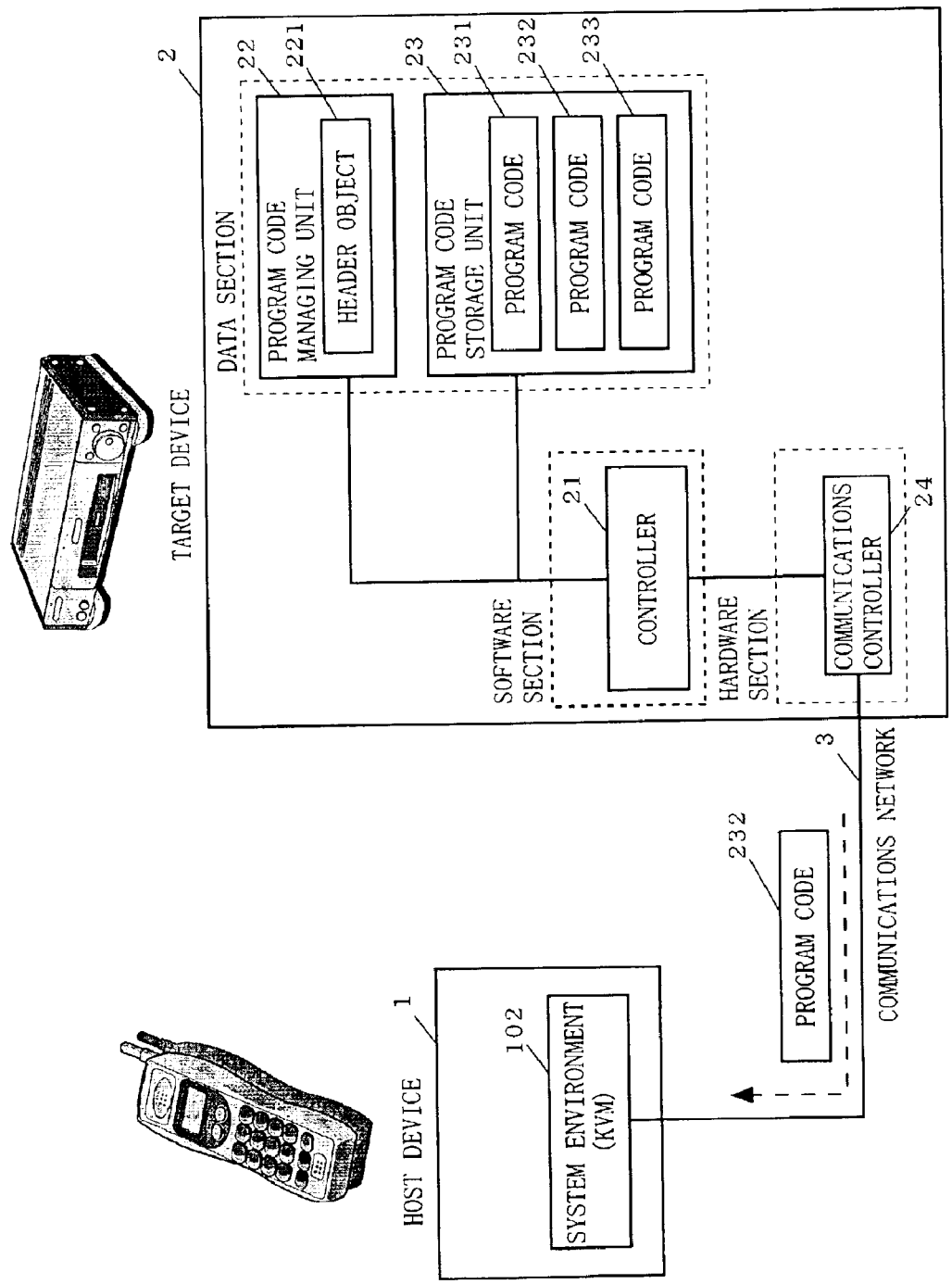

Also, FIG. 6 is an illustration for describing another exemplary case in which the host device 1 is a cellular phone having therein a virtual machine (here, KVM) 102 installed and the target device 2 is a VCR.

In FIG. 6, with the host device 1 and the target device 2 being connected to each other via the communications network 3, the header object 221 is uploaded by the header object uploader 12 from the target device 2. After the header object 221 is uploaded, it is then determined by the header object parser 11 whether the system environment for the virtual machine 102, that is, the program code 232 for KVM, has been stored in the target device 2. If such program code has been stored, the program code 232 is uploaded by the program code uploader 13 from the target device 2 based on the storage address "0x02".

EXAMPLE 2

A case of determining device specifications and user's preferences as the system environment of the host device 1

In this case, a plurality of desired parameters associated with specifications of the host device 1 (hereinafter referred to as device specs) are combined in advance as possible execution environments of the host device 1, and are then classified into a plurality of cases. Then, pieces of program code each uniquely corresponding to each case are generated, and are then previously stored in the target device 2 together with the header object associated with these pieces of program code. Such parameters include the operating frequency of the CPU, the size of the cache memory, and graphics (the number of colors that can be simultaneously reproduced).

By way of example, as illustrated in a list of FIG. 7, a plurality of Cases A through D representing a combination of parameters of the device specs are generated in advance. In the example of FIG. 7, each case contains items, such as a GUI (Graphical User Interface) language, mandatory conditions (Mandatory) that should be satisfied in order to enable execution of the program code, and recommended conditions (Recommendable) that may not necessarily be satisfied for execution but are required for a comfortable operation of the host device 1. The program code storage unit 23 generates program code 231 for Case A, program code 232 for Case B, program code 233 for Case C, and program code 234 for Case D, and then stores these pieces of program code in each predetermined address area (FIG. 8A). Then, the program code managing unit 22 stores a header object 221 including the desired parameters of the device specs (hereinafter referred to as spec information) for the program code 231, spec information for the program code 232, spec information for program code 233, spec information for program code 234, and address information indicative of storage locations of these pieces of program code (FIG. 8B).

With the use of the header object 221 and the pieces of program code 231 through 234, a process of uploading optimal program code from the target device 2 is performed by the host device 1 as follows.

Figure 9:
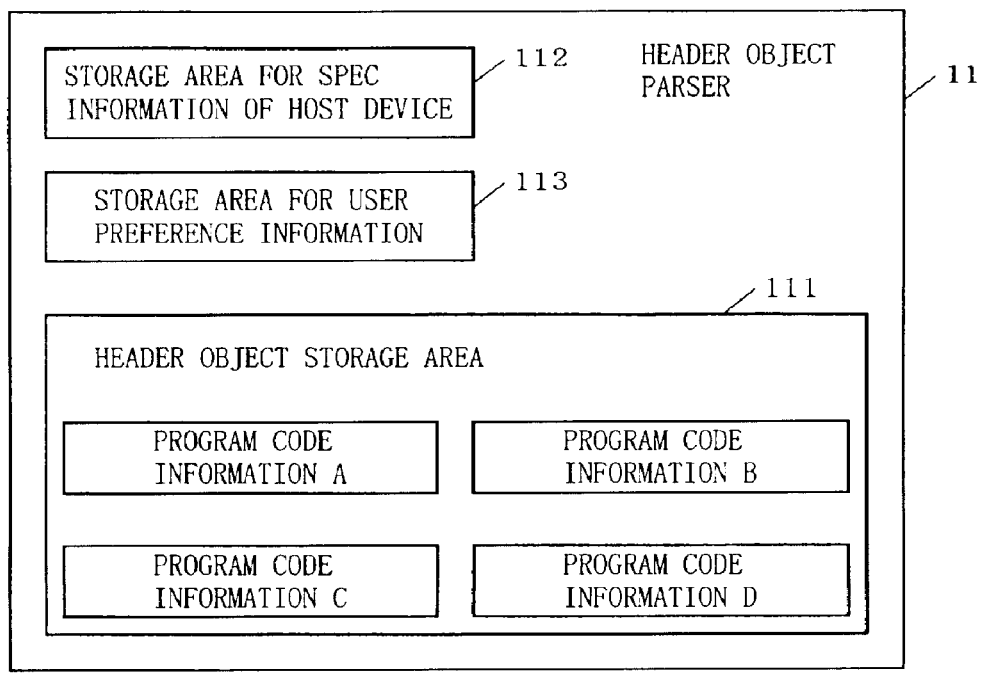
FIG. 9 is an illustration for describing the inside of a header object parser in Example 2 according to the first embodiment.
Figure 10:
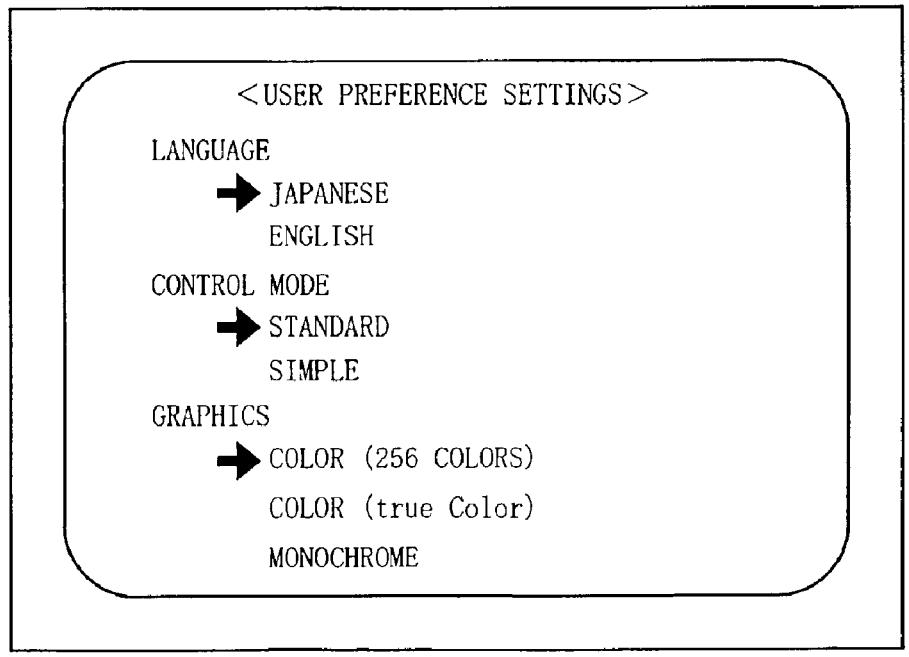
FIG. 10 is an illustration showing one example of user preference information managed by the header object parser of FIG. 9.

In <Example 2>, the header object parser 11 of the host device 1 includes an area (upload list) 111 for storing information contained in the header object 221 uploaded from the target device 2, an area 112 for storing information about the device specs of the host device 1, and an area 113 for storing user preference information (FIG. 9). The spec information managed in the storage area 112 includes the same items as those illustrated in FIG. 7. The user preference information managed in the storage area 113 includes, as illustrated in FIG. 10, information associated with setting of the GUI language, graphics (the number of colors that can be simultaneously reproduced), and a control mode that defines the number of executable commands (play back, stop, etc.), for example. This user preference information can be arbitrarily set by a user via an input unit (not shown).

The procedure of determining program code performed by the host device 1 including the above-structured header object parser 11 is described below with reference to flow charts shown in FIGS. 11 and 12.

Figure 11:
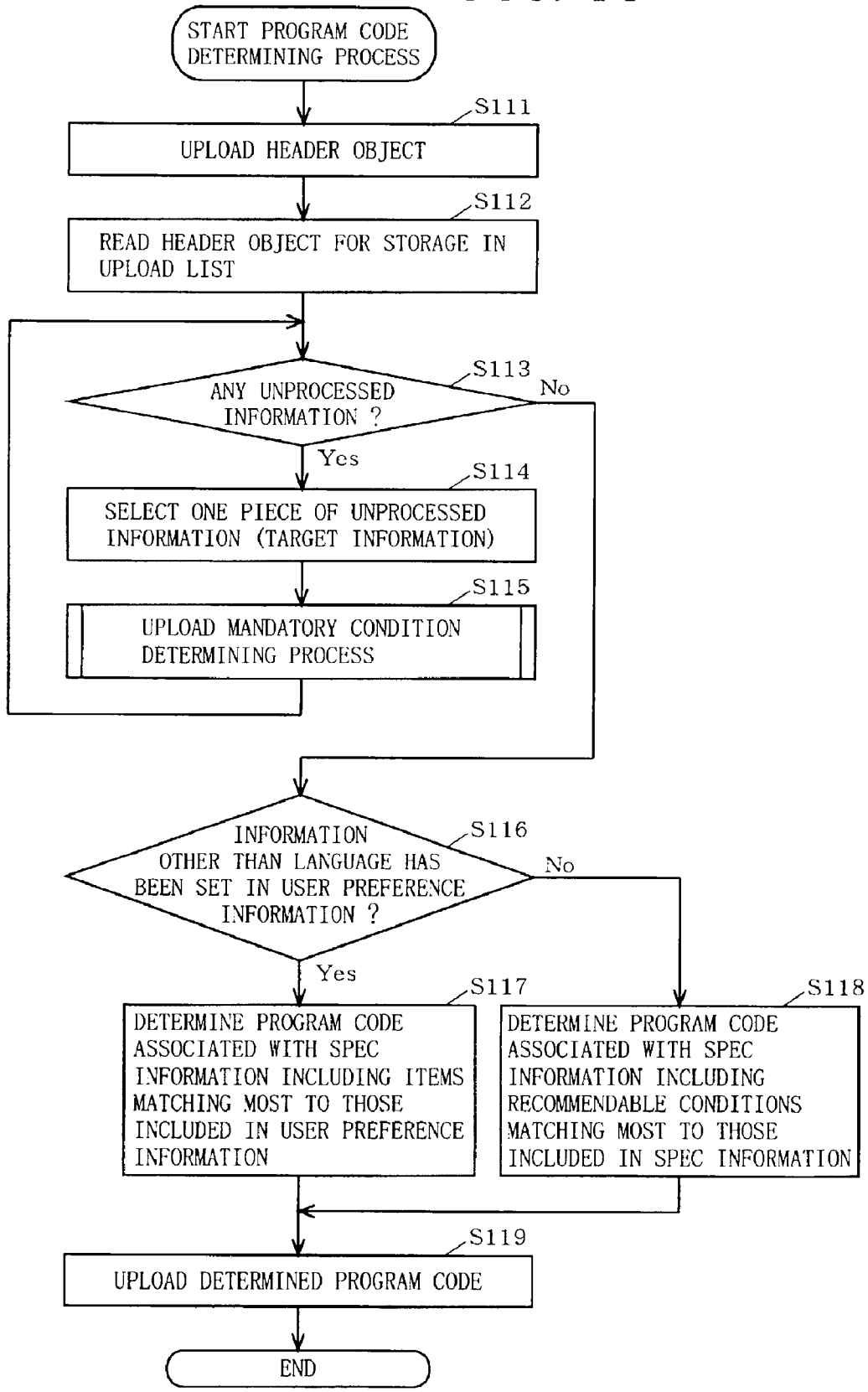
FIG. 11 is a flow chart showing the procedure of determining program code performed by a host device in Example 2 according to the first embodiment.

Referring to FIG. 11, with the host device 1 and the target device 2 being connected to each other via the communications network 3, the header object 221 is uploaded by the header object uploader 12 from the target device 2 (step S111). The header object parser 11 reads the uploaded header object 221 for storage in the upload list 111 (step S112). Then, the header object parser 11 selects one piece of spec information unprocessed from a plurality of pieces of spec information included in the stored header object 221 (steps S113 and S114). Such selected spec information is hereinafter referred to as target information. Then, the header object parser 11 performs a process of determining upload mandatory conditions as illustrated in FIG. 12 (step S115).

Figure 12:
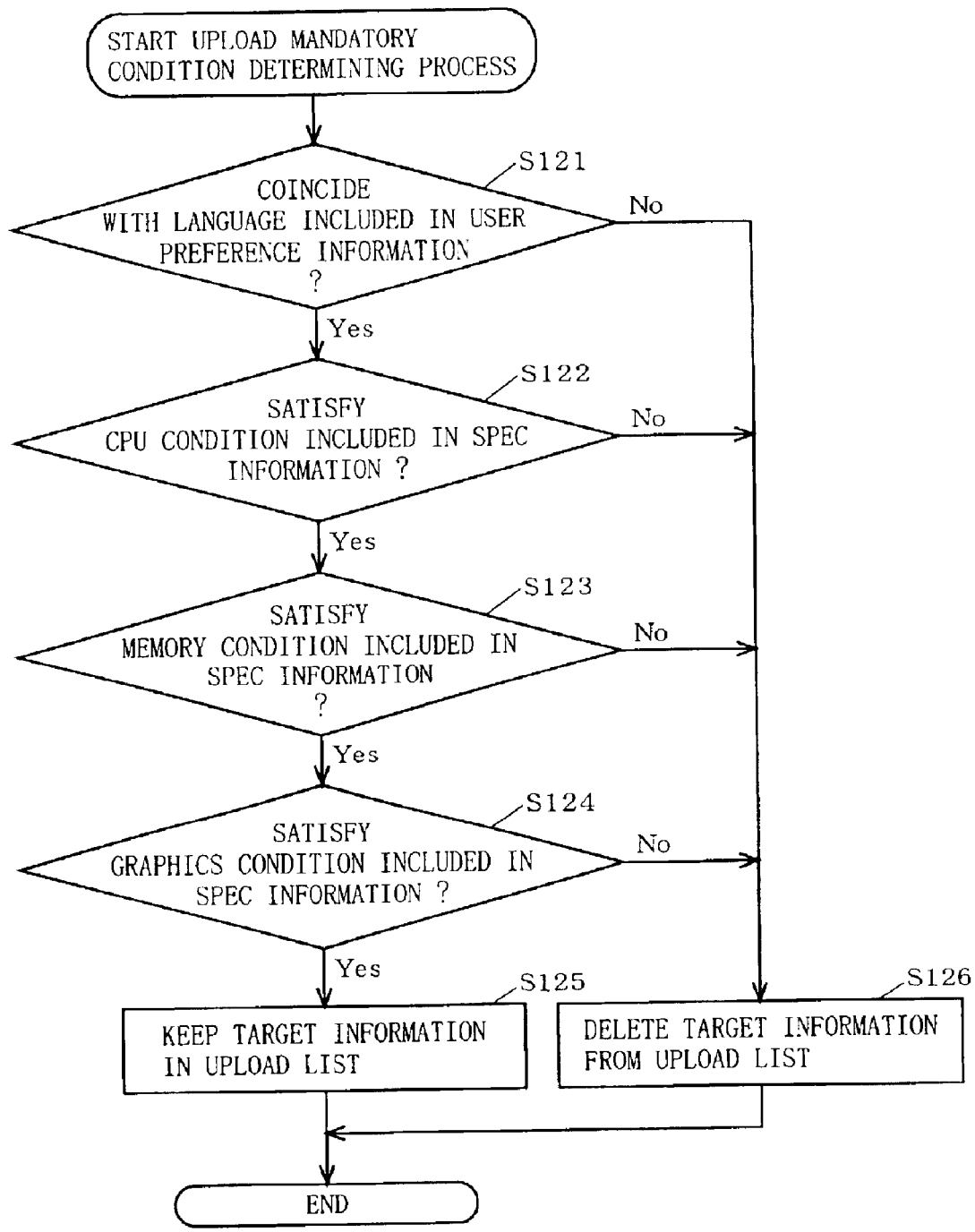
FIG. 12 is a flow chart showing the detailed procedure of determining upload mandatory requirements performed in step S115 of FIG. 11.

With reference to FIG. 12, the header object parser 11 determines whether the language contained in the user preference information stored in the storage area 113 coincides with the language displayed on a GUI at the time of execution of the program code of the target information (that is, the GUI language contained in the target information) (step S121). If it is determined that both GUI languages coincide with each other, the header object parser 11 then compares the mandatory condition associated with the CPU contained in the target information with that contained in the spec information stored in the storage area 112 to determine whether the mandatory condition associated with the CPU can be satisfied (step S122). If it is determined that such CPU condition can be satisfied, the header object parser 11 then compares the mandatory condition associated with the memory contained in the target information with that contained in the spec information stored in the storage area 112 to determine whether the mandatory condition associated with the memory can be satisfied (step S123). If it is determined that such memory condition can be satisfied, the header object parser 11 then compares the mandatory condition associated with graphics contained in the target information with graphics setting contained in the user preference information to determine whether the mandatory condition associated with graphics can be satisfied (step S124).

Then, if it is determined in the above steps S121 through S124 that the respective conditions can be satisfied, the header object parser 11 keeps this target information in the upload list 111 (step S125). On the other hand, if it is determined in even one of these steps S121 through S124 that the condition cannot be satisfied, the header object parser 11 deletes this target information from the upload list 111 (step S126).

The determining process of steps S114, S115, and S121 through S124 are carried out on every piece of spec information contained in the header object 221 stored in the upload list 111 (step S113).

Referring back to FIG. 11, upon completion of the determining process carried out on every piece of spec information contained in the header object 221 read to the upload list 111 (step S113, No), the header object parser 11 then performs the following process of determining user preference conditions by using the spec information kept in the upload list 111.

The header object parser 11 checks the storage area 113 to see whether any items other than the GUI language are included in the user preference information (step S116). If such items are included, the header object parser 11 compares each spec information kept in the upload list 111 with the items included in the user preference information. The header object parser 11 then determines, as optimal program code, a piece of program code associated with the spec information that includes items best matching those included in the user preference information (step S117). If it is determined in step S116 that such items are not included, the header object parser 11 compares the recommendable conditions in every piece of spec information kept in the upload list 111 with those in the spec information stored in the storage area 112. The header object parser 11 then determines, as optimal program code, a piece of program code associated with the spec information that includes the recommendable conditions best matching those included in the spec information (step S118).

The program code uploader 13 then uploads the optimal program code determined by the header object parser 11 from the target device 2 based on the storage address (step S119).

As described above, according to the device control system of the first embodiment, a plurality of pieces of program code are previously stored in the target device. Of these pieces of program code, the host device determines a piece of program code optimal to its own system environment, and then automatically uploads the determined program code from the target device. Also, since the plurality of pieces of program code are provided to the target device, it is enough for the host device to be provided with a system environment complying only with its own functions and capabilities. With this, not only high-spec devices, such as television receivers or STBs, but also low-spec devices, such as PDAs or cellular phones, can be utilized as a host device. Also, since the optimal program code is automatically determined at the host device side, the users do not have to determine the optimal program code by themselves nor take the trouble to check the OS or specifications of their device.

Furthermore, in the above first embodiment, the optimal program code is determined based on both of the spec information and the user preference information stored in the host device. Alternatively, either one of these pieces of information can be used singly for determining the optimal program code.

Still further, according to the device control system according to the first embodiment, the developer of the target device describes a plurality of pieces of program code classified by possible virtual machine, possible device specs, or others. Such classification enables the developer to easily provide pieces of program code for enabling the host device under various system environments to optimally operate. Still further, when the pieces of program code are classified by type of possible virtual machine, the host device can determine optimal program code from among the plurality of pieces of program code stored in the target device only by determining the name of the virtual machine. This can achieve reduction in cost. Still further, when the pieces of program code are classified by device specs, the developer of the target device can uniquely define, to some extent, conditions for executing the program code generated by the developer. With this, upcoming versions of the host device and the target device can be supported.

(Second Embodiment)

In the first embodiment, only a single piece of program code stored in the target device uniquely corresponds to a fixed system environment (a virtual machine, device specs, etc.) of the host device. Normally, such program code is generated for all functions controllable in the corresponding system environment, and therefore is large in data size. Therefore, there may be some cases in which the program code cannot be uploaded to the memory area depending on the free space in the memory area, such as ROM, of the host device.

In view of the above, a device control system according to a second embodiment, which is described below, enables uploading of optimal program code further in consideration of the free space in the memory area of the host device as well as the system environment thereof.

The basic configuration of the device control system according to the second embodiment of the present invention is similar to that according to the first embodiment. However, the device control system according to the second embodiment is different in a process performed by a header object parser 11 of the host device 1, a header object 221 stored in a program code managing unit 22, and pieces of program code 231 through 23n stored in the program code storage unit 23 of the target device 2.

Hereinafter, the device control system according to the second embodiment is described by mainly focusing on the above-stated differences from the first embodiment. Specifically, an exemplary case is described below, in which pieces of program code 231 through 23n corresponding to the types of possible virtual machines installed in the host device 1.

First, with further reference to FIGS. 13A and 13B, specific examples of the header object 221 stored in the program code managing unit 22 of the target device 2 and the pieces of program code 231 through 23n stored in the program code storage unit 23 of the target device 2 are described below.

In the above first embodiment, a single piece of program code uniquely corresponding to a single virtual machine is generated. In the second embodiment, on the other hand, a plurality of pieces of program code of different data sizes are generated for each virtual machine. By way of example, as illustrated in FIG. 13A, a plurality of pieces of program code 231 through 236 classified by predetermined available functions are generated for each virtual machine. Here, this classification is not restrictive, and can be arbitrarily made. By way of example only, Class 1 enables all available functions, and Class 2 enables only part of the available functions. As such, it is possible to provide a plurality of pieces of program code of different data sizes including program code restricting the use of the available functions.

Figures 13A, 13B:
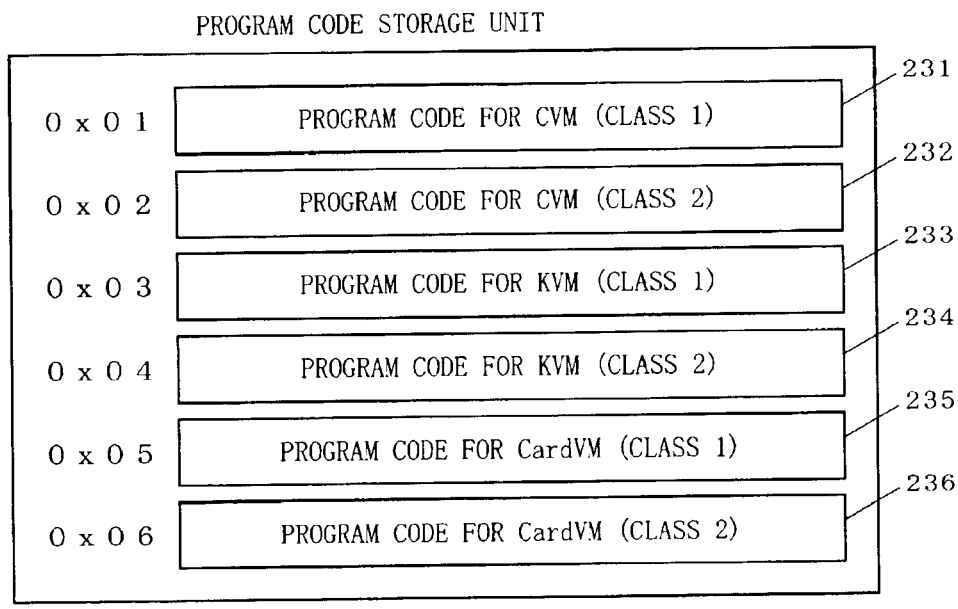
FIGS. 13A and 13B are illustrations showing one example of a header object and pieces of program code to be used in the second embodiment.

The program code managing unit 22 stores a header object 221 including, for each of the pieces of program code 231 through 236 stored in the program code storage unit 23, a system environment indicative of a correspondence to a virtual machine, the data size of the relevant program code, and a storage address thereof (FIG. 13B).

With the use of the header object 221 and the pieces of the program code 231 through 236 stored as such, the following process of uploading optimal program code is performed by the host device 1.

Figure 14:
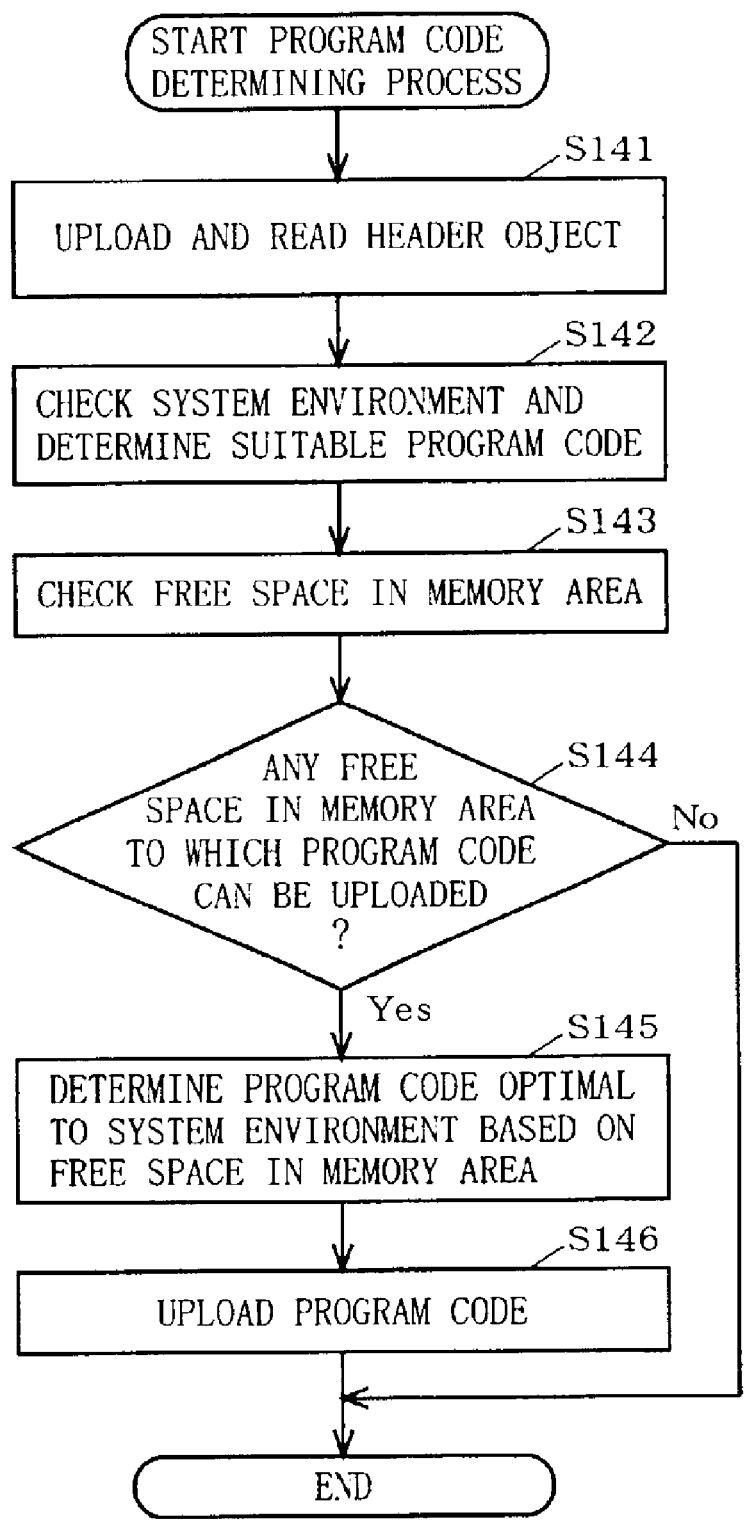
FIG. 14 is a flow chart showing the procedure of determining program code performed by a host device according to the second embodiment.

FIG. 14 is a flow chart showing the procedure of determining program code performed by the host device 1 according to the second embodiment.

Upon being connected to the target device 2 via the communications network 3 for communications, the host device 1 gives predetermined instructions associated with uploading through the CPU 18 and the controller 14 in order to cause the header object parser 11, the header object uploader 12, and the program code uploader 13 to perform the following processes.

First, the header object uploader 12 uploads the header object 221 stored in the program code managing unit 22 of the target device 2 via the communications controller 24, the communications network 3, and the communications controller 15 to the RAM 17. The header object parser 11 reads the header object 221 uploaded to the RAM 17 (step S141). The header object parser 11 then checks the system environment of the host device 1 (in this example, the type of virtual machine). The header object parser 11 then determines a plurality of pieces of program code suitable for the checked system environment based on the system environment for each program code contained in the header object 221 (step S142).

The header object parser 11 then checks the free space in the memory area of the host device 1 (step S143). The header object parser 11 then determines, based on the information about the data size of each program code contained in the header object 221, whether the memory area has enough free space to which any one of the determined suitable pieces of program code can be uploaded (step S144).

If it is determined in step S144 that the memory area has enough free space, the header object parser 11 determines one piece of program code of the largest data size up to the free space as the optimal program code (step S145). The determined optimal program code is then uploaded by the program code uploader 13 from the program code storage unit 23 of the target device 2 to the ROM 16 (step S146).

If the memory area does not have enough free space, on the other hand, the header object parser 11 determines that the target device 2 cannot be controlled, and then ends the process.

Figure 15:
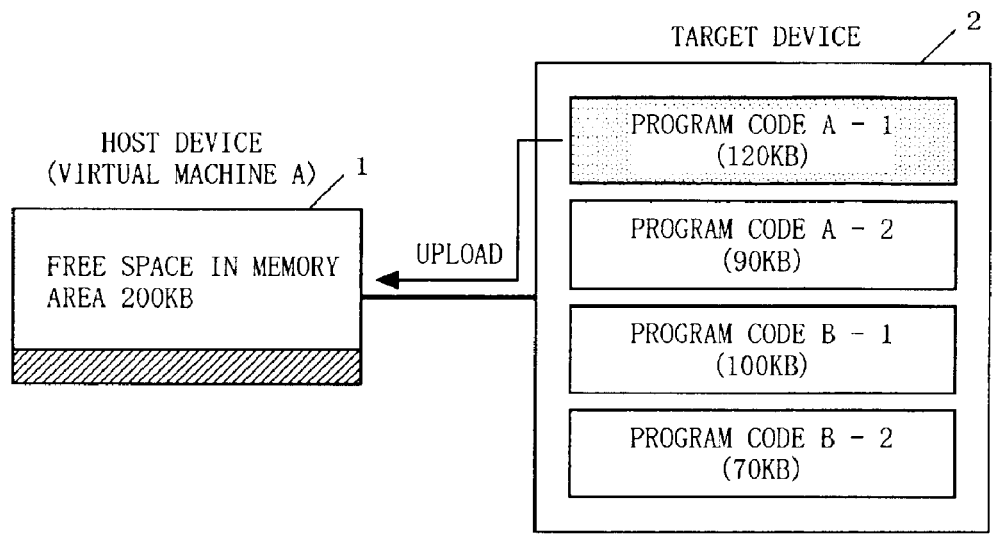
FIGS. 15 and 16 are illustrations for describing one example of an uploading process based on the second embodiment.
Figure 16:
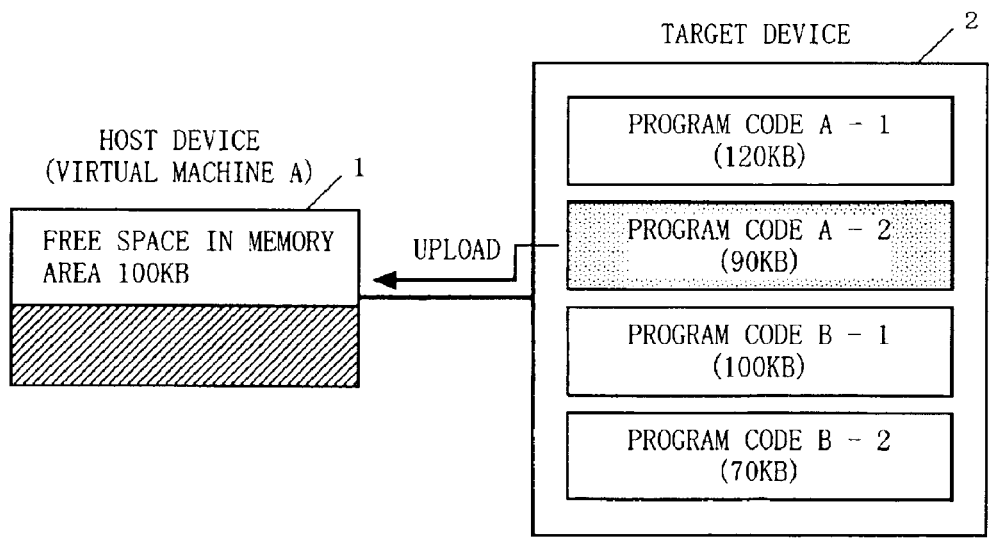

With reference to FIGS. 15 and 16, a specific example of the above process of determining the program code is further described below. In this example, a target device 2 stores program code A-1 (data size: 120 KB) and program code A-2 (data size: 90 KB) for a virtual machine A. Here, the program code A-2 enables a control of less functions than those of the program code A-1. Further, the target device 2 stores program code B-1 (data size: 100 KB) and program code B-2 (datasize: 70 KB) for a virtual machine B. Here, the program code B-2 enables a control of less functions than those of the program code B-1. It is assumed herein that a host device 1 has the virtual machine A installed therein.

(1) If the free space in the memory area of the host device 1 is larger than the data size of the program code A-1 for the virtual machine A and the data size of the program code A-2 therefor, the host device 1 uploads the program code A-1, which is the largest in data size of the pieces of program code that can be stored in the free space in the memory area, from the target device 2 (FIG. 15).

(2) If the free space in the memory area of the host device 1 is smaller than the data size of the program code A-1 and larger than the data size of the program code A-2, the host device 1 uploads the program code A-2, which is the only one that can be stored in the free space in the memory area, from the target device 2 (FIG. 16).

As described above, according to the second embodiment of the present invention, a plurality of pieces of program code each having a different data size for each possible system environment of the host device are provided to the target device. The host device determines a piece of program code suitable for the free space of its memory area as well as its system environment, and then automatically uploads the determined program code from the target device. With this, it is possible to determine the suitable program code further in consideration of the dynamically-variable memory area of the host device.

In the second embodiment, of a plurality of pieces of program data for the system environment of the host device, the program code which is the largest in data size of the pieces of program code that can be stored in the available free space in the memory area is automatically uploaded. Alternatively, program code that is desired by the user can be manually uploaded. With this, the user can select only desired functions (for example, functions "play back", "stop", "fast-forward", and "rewind" in a VCR) for control.

In the second embodiment, a plurality of pieces of program code of different data sizes are generated for each virtual machine. This is not meant to be restrictive, and the plurality of pieces of program code can correspond to two or more virtual machines.

(Third Embodiment)

The device control systems in the above first and second embodiments can be achieved as long as one host device and one target device are connected to each other. When these device control systems are applied to a case where a plurality of host devices are to control a single target device, however, each host device has to separately determine the program code by itself for uploading. In order for these host devices to relationally perform a specific control, it is preferable to upload program code in consideration of the state of every host device.

In view of the above, a device control system according to a third embodiment, which is described below, enables a host device to determine optimal program code to be uploaded from the target device by further taking in consideration the state of program code stored in another host device connected to the same network.

Figure 17:
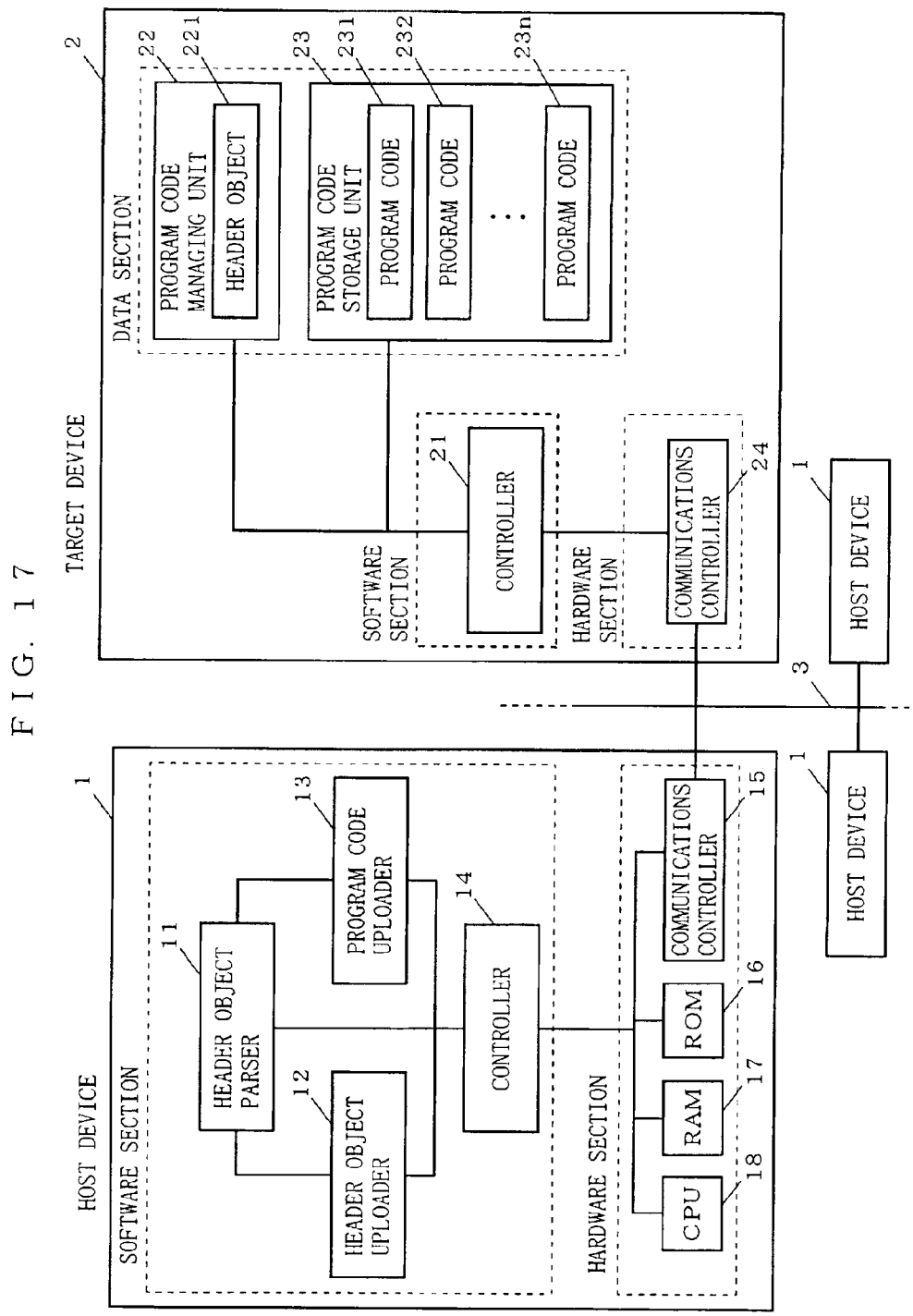
FIG. 17 is a block diagram illustrating a device control system according to third and fourth embodiments of the present invention.

FIG. 17 is a block diagram illustrating the configuration of the device control system according to the third embodiment of the present invention. In FIG. 17, the device control system according to the third embodiment includes a plurality of host devices 1 and at least one target device 2 being connected to each other via a wire or wireless communications network 3.

Each host device 1 and the target device 2 according to the third embodiment are basically similar in structure to those according to the second embodiment. However, a process performed by a header object parser 11 included in one of the host devices 1 that performs a control (hereinafter referred to as a main host device 1) is different from that according to the second embodiment.

The device control system according to the third embodiment is described below by mainly focusing on the differences from the first and second embodiments. Here, an exemplary case is specifically considered in which, as illustrated in FIGS. 13A and 13B, classified pieces of program code 231 through 236 are stored in a program code storage unit 23 and a header object 221 related to these pieces of program code 231 through 236 is stored in a program code managing unit 22.

Figure 18:
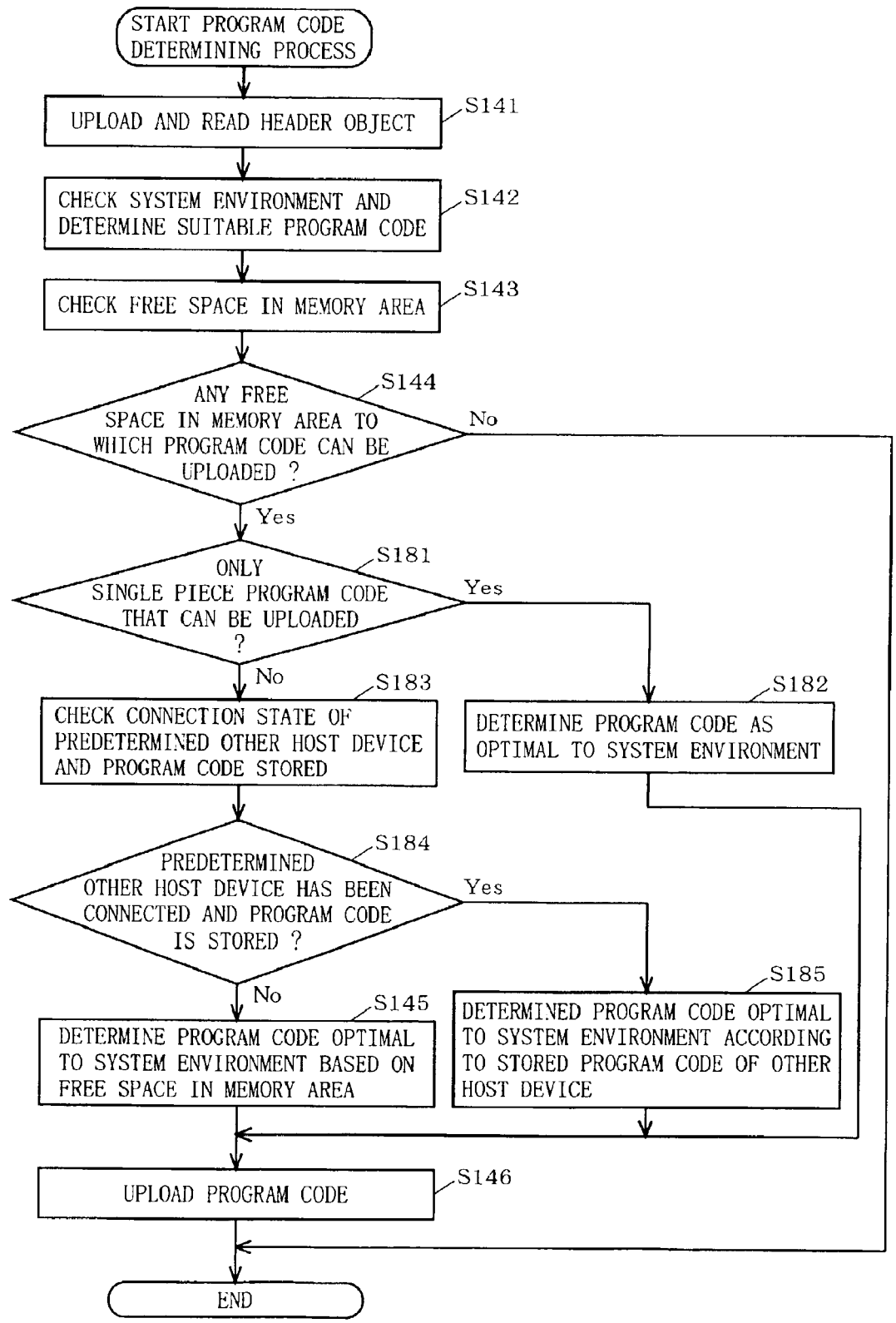
FIG. 18 is a flow chart showing the procedure of determining program code performed by a host device according to the third embodiment of the present invention.

FIG. 18 is a flow chart showing the procedure of determining program code performed by the main host device 1 according to the third embodiment. In FIG. 18, steps of performing the same processes as those in FIG. 14 are provided with the same step numbers, and are not described in detail herein.

Based on the type of virtual machine installed in the main host device 1 and the header object 221 uploaded from the target device 2, a header object parser 11 included in the main host device 1 determines a plurality of pieces of program code suitable for the virtual machine (steps S141 and S142). Then, based on the checked free space in the memory area and the header object 221, the header object parser 11 determines whether the memory area has enough free space to which program code for the virtual machine can be uploaded (steps S143 and S144). If the memory area has enough free space, the header object parser 11 further determines the number of pieces of program code that can be uploaded (step S181).

If only a single piece of program code that can be uploaded is found in step S181, the header object parser 11 determines that program code as optimal program code (step S182). Then, a program code uploader 13 included in the main host device 1 uploads the determined program code from the target device 2 (step S146).

On the other hand, if a plurality of pieces of program code that can be uploaded are found in step S181, the header object parser 11 checks via the network whether any other device 1 that should be related for performing a special control is connected to the network and, if such other host device 1 is connected, whether ROM 16 included in that host device 1 stores a specific piece of program code (steps S183 and S184). If it is determined that such other host device 1 is connected and such specific program code is stored, the header object parser 11 determines, with reference to the specific program code, a piece of program code for the special control as the optimal program code (step S185). The program code uploader 13 then uploads the determined program code for the special control from the target device 2 (step S146).

If it is determined that no such other host device 1 is connected or if no such program code for the specific control is stored, the optimal code is determined and then uploaded in accordance with steps S145 and S146 of the second embodiment.

The following are specific examples of the device control system according to the third embodiment that is provided at home.

(1) A system includes a television placed at the first floor and a television place at the second floor, and both of these televisions serve as host devices. An air conditioner placed at the second floor serves as a target device. In such a system, consider a case where the television placed at the second floor stores program code enabling a control of all functions of the air conditioner. In this case, when the television at the first floor is used as another host device for controlling the air conditioner, it is first determined that the program code enabling a control of all functions of the air conditioner is stored in the television at the second floor. Then, to the television at the first floor, program code only enabling a control of a limited functions of the air conditioner ("POWER ON/OFF" only, for example) is uploaded. With this, it is possible to prevent, for example, the setting of the temperature of the air conditioner controlled by a person through the television at the second floor from being changed by another person through the television at the first floor.

(2) A system includes a television serving as a host device and a VCR serving as a target device, both being connected to each other via a network. In such a system, consider a case where the television stores program code enabling a control of all functions of the VCR. In this case, when a PDA connectable to the Internet is newly connected as another host device for controlling the VCR, it is first determined that the program code enabling a control of all functions of the VCR is stored in the television. Then, to the PDA, program code enabling retrieval of EPG (electronic programme guide) information through the Internet is uploaded. With this, it is possible to retrieve EPG information through the Internet and supply the EPG information to the television via the network.

As described above, according to the device control system of the third embodiment, for the purpose of performing a device control, the main host device determines optimal program code to be uploaded from the target device by further taking in consideration the state of program code stored in another host device connected to the same network. With this, it is possible to perform a specific control with a plurality of host devices having a specific relation to each other.

(Fourth Embodiment)

In the above second and third embodiments, whether the program code can be uploaded or not is determined only based on the free space in the memory area of the host device for device control. Therefore, if the free space in the memory area of the host device is smaller than the data size of program code which is the smallest of those pieces of program code that are suitable for the system environment, no program code can be uploaded.

In view of the above, a device control system according to a fourth embodiment, which is described below, further considers the state of program code stored in another host device connected to the same network as well as the free space in the memory area of the other host device. With this, it is possible to determine optimal program code to be uploaded from the target device, and determine a host device to which the optimal program code is uploaded.

As with the above third embodiment (FIG. 17), the device control system according to the fourth embodiment includes a plurality of host devices 1 and at least one target device 2 being connected to each other via a wire or wireless communications network 3. Each host device 1 and the target device 2 according to the fourth embodiment are basically similar in structure to those according to the third embodiment. However, a process performed by a header object parser 11 included in a main host device 1 is different from that according to the third embodiment.

The device control system according to the fourth embodiment is described below by mainly focusing on the differences from the first through third embodiments. Here, an exemplary case is specifically considered in which, as illustrated in FIGS. 13A and 13B, classified pieces of program code 231 through 236 are stored in a program code storage unit 23 and a header object 221 related to these pieces of program code 231 through 236 is stored in a program code managing unit 22.

Note that, in order to achieve the device control system according to the fourth embodiment, it is assumed herein that the pieces of program code 231 through 236 each include a private command for actually controlling the target device 2, and a GUI program for sending a global command enabling a remote control of designation of the private command.

Figure 19:
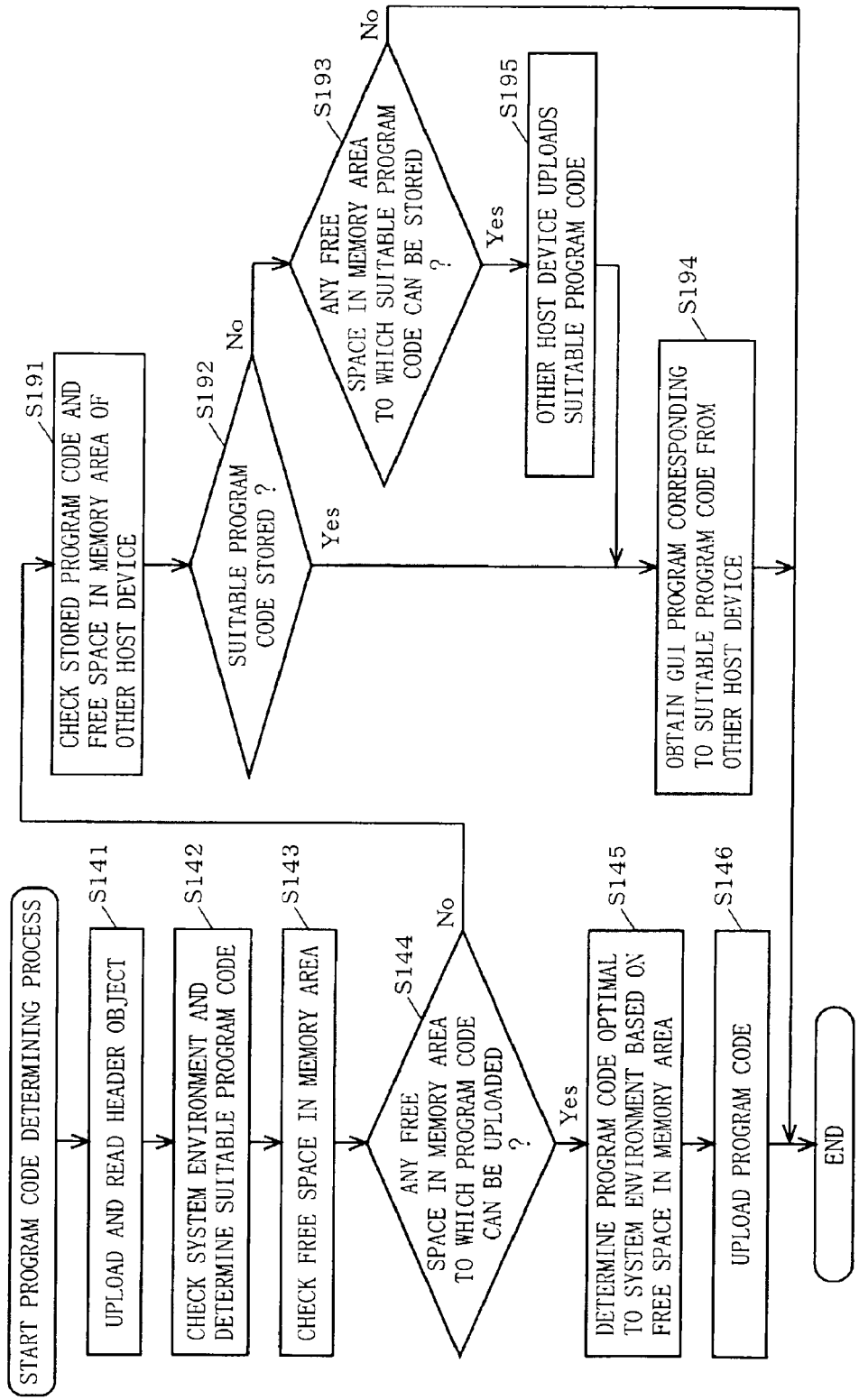
FIG. 19 is a flow chart showing the procedure of determining program code performed by a host device according to the fourth embodiment of the present invention.

FIG. 19 is a flow chart showing the procedure of determining program code performed by the main host device 1 according to the fourth embodiment. In FIG. 19, steps of performing the same processes as those in FIG. 14 are provided with the same step numbers, and are not described in detail herein.

Based on the type of virtual machine installed in the main host device 1 and the header object 221 uploaded from the target device 2, the header object parser 11 included in the main host device 1 determines a plurality of pieces of program code for the virtual machine (steps S141 and S142). Then, based on the checked free space in the memory area and the header object 221, the header object parser 11 determines whether the memory area has enough free space to which program code for the virtual machine can be uploaded (steps S143 and S144).

If it is determined in step S144 that the memory area has enough free space, the header object parser 11 determines one piece of program code that is the largest in data size up to the free space as the optimal program code (step S145). Then, a program code uploader 13 of the main host device 1 uploads the determined optimal program code from the target device 2 (step S146).

In this case, the control of the target device 2 is performed in the same manner as those according to the first and second embodiments. That is, the main host device 1 interprets the program code stored in the ROM 16 in response to an instruction from the user. Then, the main host device 1 generates a private command, and then sends the private command directly to the target device 2.

If it is determined in step S144 that the memory area does not have enough free space, on the other hand, the header object parser 11 checks the other host devices 1 via the network to see program code stored in their ROM 16 and the free space of their memory area (step S191). The header object parser 11 then determines whether there is any other host device(s) 1 storing program code for the system environment of the main host device 1 (step S192). If no such other host device 1 is found, the header object parser 11 determines whether there is any other host device(s) 1 having enough free space in the memory area in which the program code for the system environment of the main host device 1 can be stored (step S193).

After steps S192 and S193, if the program code for the system environment of the main host device 1 is stored in any other host device(s) 1, the header object parser 11 of the main host device 1 obtains a GUI program for that program code from the found other host device 1 (step S194). If a plurality of other host devices 1 storing program code suitable for the system environment of the main host device 1 are found, the main host device 1 obtains the GUI program from a host device 1 storing suitable program code that is the largest in data size.

In this case, the control of the target device 2 is performed as follows. That is, the main host device 1 uses the obtained GUI program to send a global command in response to an instruction from the user to the other host device 1. The other host device 1 converts the received global command to a private command corresponding thereto, and then sends the private command to the target device 2.

On the other hand, if no program code suitable for the system environment of the main host device 1 is stored anywhere but there is a host device 1 having enough space in the memory area to which any program code can be uploaded, the header object parser 11 of the main host device 1 instructs the found other host device 1 to upload that program code from . If a plurality of other host devices 1 having enough free space in the memory area are found, the main host device 1 instructs only a host device 1 having the largest amount of free space in the memory area. In response to this instruction, the other host device 1 uploads the program code to its ROM 16 (step S195). The header object parser 11 of the main host device 1 then obtains a GUI program corresponding to the uploaded program code from the other host device 1 (step S194).

In this case, the control of the target device 2 is performed in the above-described manner. That is, the main host device 1 uses the obtained GUI program to send a global command in response to an instruction from the user to the other host device 1. The other host device 1 converts the received global command to a private command corresponding thereto, and then sends the private command to the target device 2.

The above process of determining program code is further described below with reference to specific examples illustrated in FIGS. 20 and 21. In these examples, it is assumed that first through third host devices 1 are provided, and that a first host device 1 controls the target device 2. Furthermore, the target device 2 stores pieces of program code A-1, A-2, B-1, and B-2 described in the above second embodiment (FIG. 15). Still further, the first through third host devices 1 each have therein a virtual machine A installed.

Figure 20:
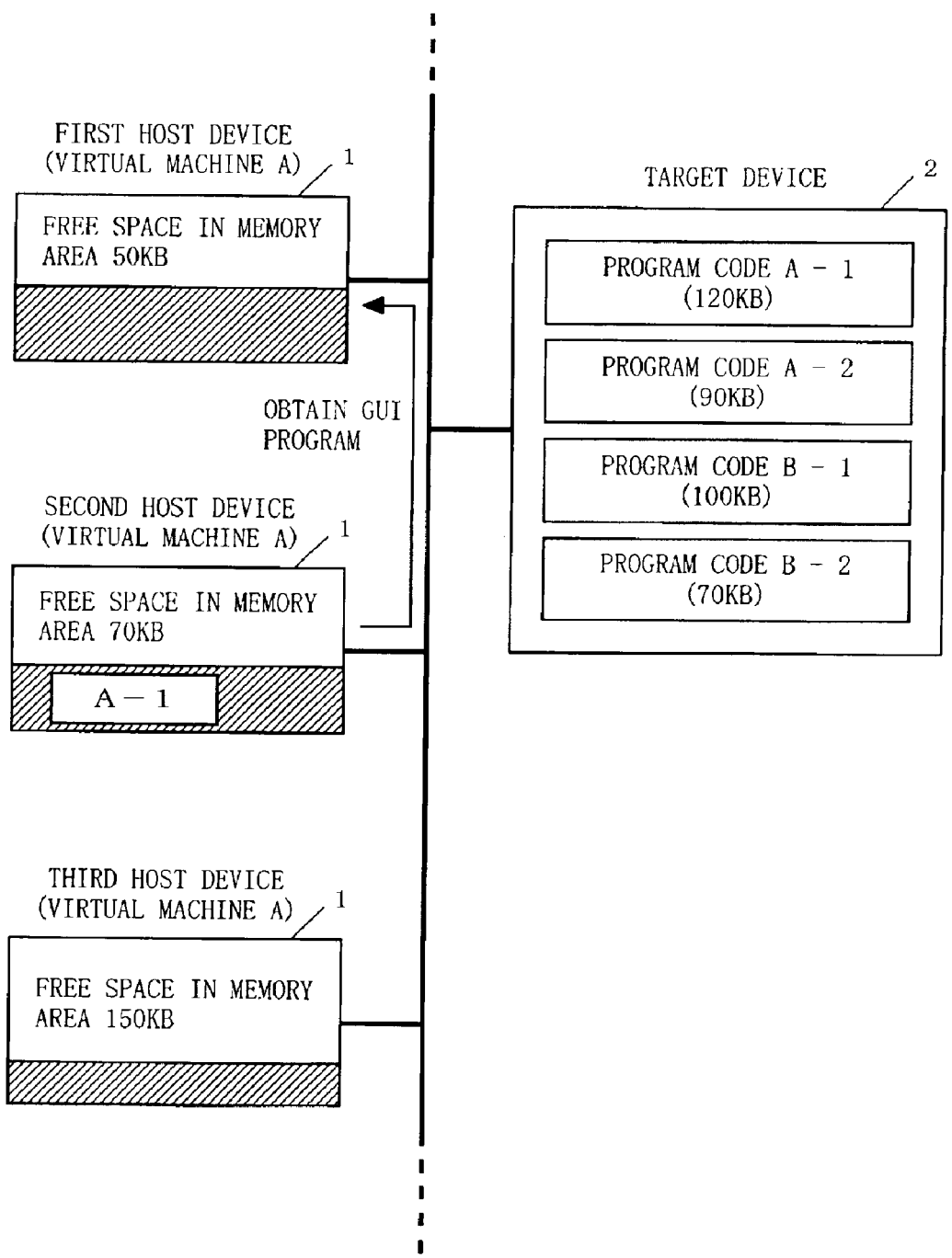
FIGS. 20 and 21 are illustrations for describing one example of an uploading process based on the fourth embodiment.

(1) In the example of FIG. 20, when the free space in the memory area of the first host device 1 is smaller than the data size of the program code A-1 for the virtual machine A and the data size of the program code A-2 therefor, the first host device 1 checks the second and third host devices 1 to see their stored program code and their free space of the memory area. As a result, it is confirmed that the second host device 1 stores the program code A-1. Therefore, the first host device 1 obtains a GUI program corresponding to the program code A-1 from the second host device 1.

The control of the target device 2 is performed as follows. That is, the first host device 1 uses the obtained GUI program to generate a global command, and then sends the global command to the second host device 1. The second host device 1 converts the global command received from the first host device 1 to a private command corresponding thereto, and then sends the private command to the target device 2.

Figure 21:
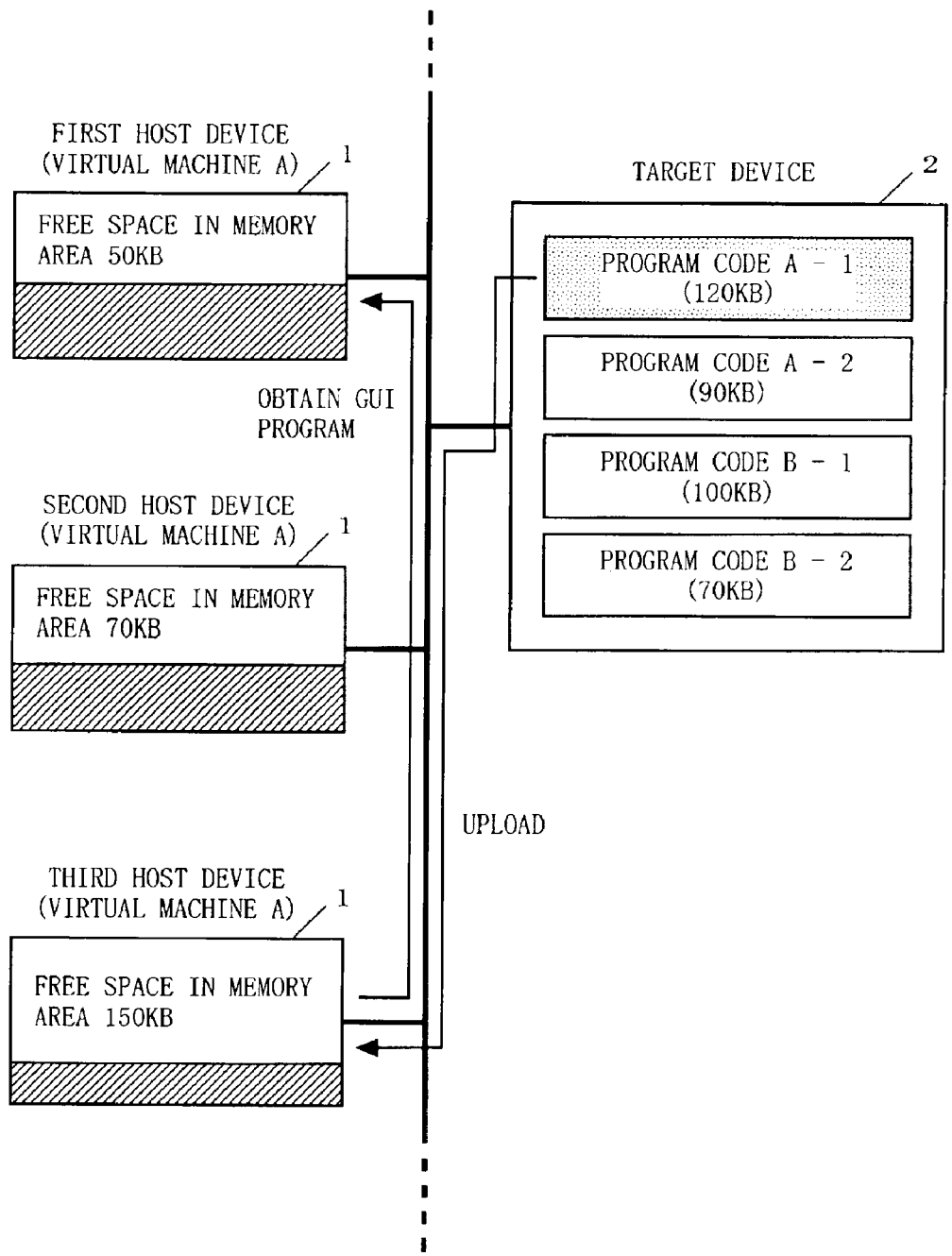

(2) In the example of FIG. 21, when the free space in the memory area of the first host device 1 is smaller than the data size of the program code A-1 for the virtual machine A and the data size of the program code A-2 therefor, the first host device 1 checks the second and third host devices 1 to see their stored program code and their free space of the memory area. As a result, it is confirmed that the third host device 1 has a free space in the memory area enough to store the program code A-1. Therefore, the first host device 1 instructs the third host device 1 to upload the program code A-1. Following the instruction, the third host device 1 uploads the program code A-1. Then, the first host device 1 obtains a GUI program corresponding to the program code A-1 from the third host device 1.

The control of the target device 2 is performed as follows. That is, the first host device 1 uses the obtained GUI program to generate a global command, and then sends the global command to the third host device 1. The third host device 1 converts the global command received from the first host device 1 to a private command corresponding thereto, and then sends the private command to the target device 2.

A specific example of the device control system according to the fourth embodiment that is provided at home is described below.

A system includes a television serving as a host device and a VCR serving as a target device, both being connected to each other via a network. In such a system, consider a case where the television stores program code enabling a control of all functions of the VCR. In this case, when a cellular phone is newly connected as a host device for controlling the VCR, it is first determined that the program code enabling a control of all functions of the VCR is stored in the television. Then, to the cellular phone, a GUI program corresponding to the program code stored in the television is uploaded. With this, only the GUI program, which is smaller in data size is caused to be stored in the cellular phone. Therefore, storage resources can be effectively used.

As described above, according to the device control system of the fourth embodiment, in order for the main host device to perform a device control, it is determined whether the optimal program code should be uploaded from the target device to the main host device 1 or another host device 1, based on the state of program code stored in another host device connected to the same network and the free space in their memory areas. With this, even when the free space in the memory area of the main host device 1 is smaller than the data size of the program code suitable for the system environment that is the smallest, it is possible to control the target device via the other host device.

(Fifth Embodiment)

In the device control systems according to the above first through fourth embodiments, the host device determines its own system environment and the free space in the memory area to determine optimal program code to be uploaded.

Next, a device control system according to a fifth embodiment is described below, in which a target device determines the system environment of a host device and the free space in the memory area of the host device, thereby determining optimal program code to be uploaded.

Figure 22:
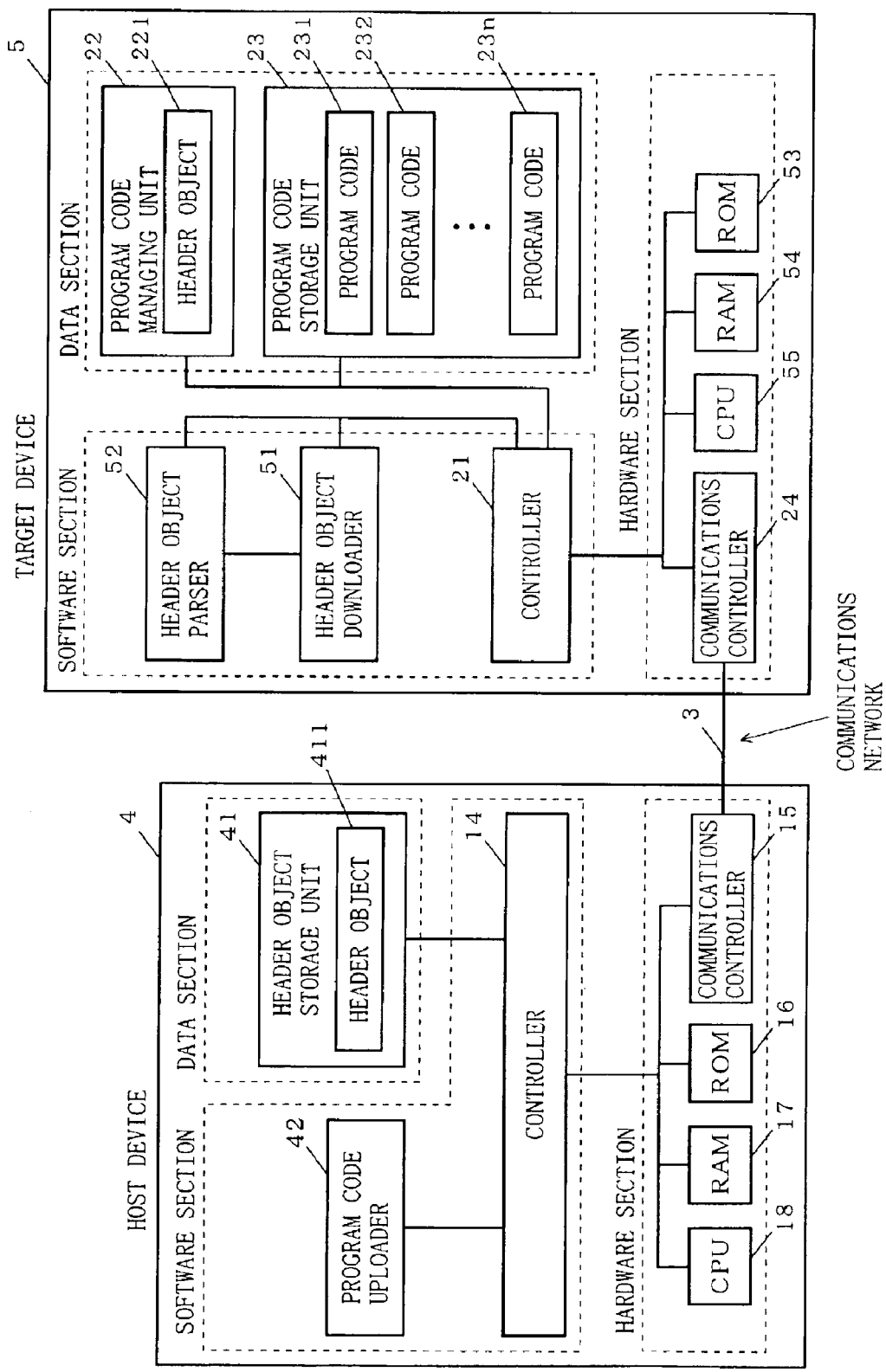
FIG. 22 is a block diagram illustrating the configuration of a device control system according to a fifth embodiment of the present invention.

FIG. 22 is a block diagram illustrating the configuration of the device control system according to the fifth embodiment. In FIG. 22, the device control system includes at least one host device 4 and at least one target device 5 being connected to each other via a wire or wireless communications network 3.

The host device 4 includes a header object storage unit 41, a program code uploader 42, a controller 14, a communications controller 15, ROM 16, RAM 17, and a CPU 18. The target device 5 includes a controller 21, a program code managing unit 22, a program code storage unit 23, a header object downloader 51, a header object parser 52, a communications controller 24, ROM 53, RAM 54, and a CPU 55.

The device control system according to the fifth embodiment is different from that according to the first embodiment in that the host device 4 includes the header object storage unit 41 and the program code uploader 42, and that the target device 5 includes the header object downloader 51, the header object parser 52, the ROM 53, the RAM 54, and the CPU 55.

The device control system according to the fifth embodiment is described below by mainly focusing on the above-stated differences from the first embodiment.

Figure 23A:
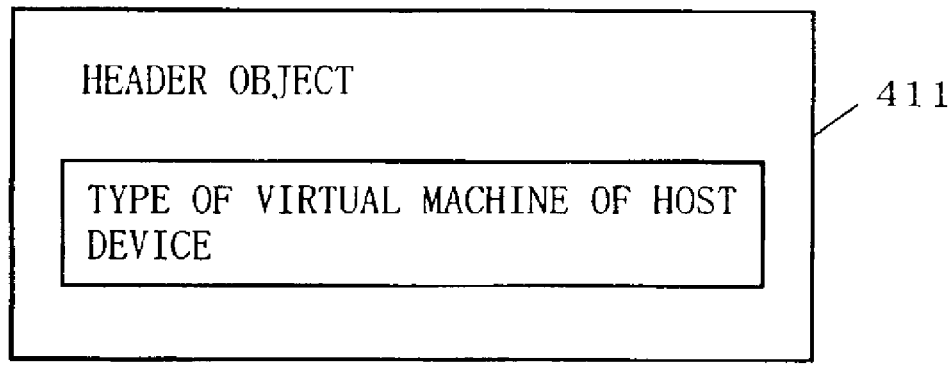
FIGS. 23A and 23B are illustrations each showing one example of a header object in the fifth embodiment.
Figure 23B:
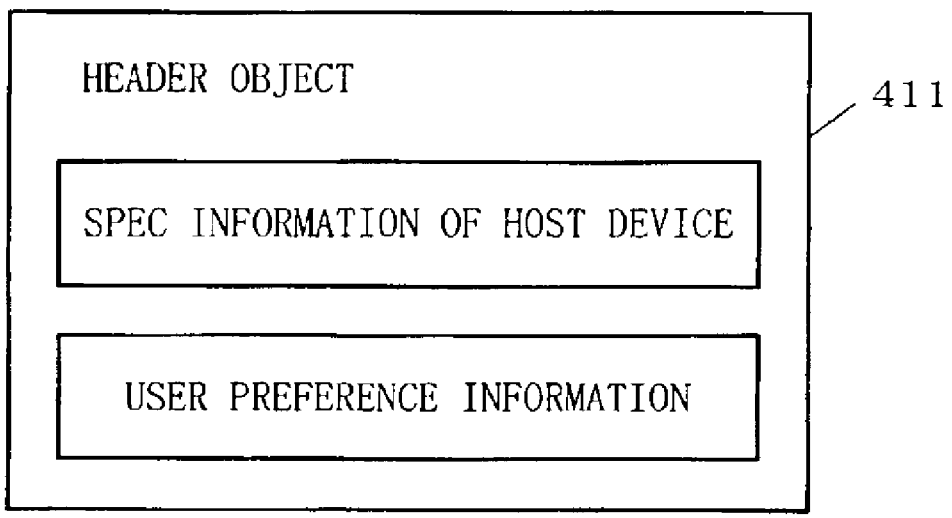

In the host device 4, the header object storage unit 41 stores a header object 411 that gives information about the host device 4. This header object 411 includes information indicative of the type of virtual machine installed in the host device 4 (FIG. 23A), if being related to <Example 1> in the first embodiment. If being related to <Example 2> therein, the header object 411 includes device specs information and user preference information (FIG. 23B).

With the host device 4 and the target device 5 being connected to each other via the communications network 3 for communications, the CPU 55 and the controller 21 of the target device 5 give predetermined instructions associated with downloading to cause the header object downloader 51 and the header object parser 52 to perform the following processes.

First, the header object downloader 51 downloads the header object 411 stored in the header object storage unit 41 of the host device 4 to the RAM 54 via the communications controller 15, the communications network 3, and the communications controller 24. The header object parser 52 then reads the header object 411 downloaded by the header object downloader 51. The header object parser 52 then parses the header object 411 and the header object 221 stored in the program code managing unit 22 to determine optimal program code to be uploaded by the host device 4. This determination can be made as follows. In a case where information associated with the virtual machine is included in the downloaded header object 411, it is determined whether such information matches the information included in the header object 211. In a case where spec information and user preference information are included in the downloaded header object 411, the determination is made according to the above-described flow charts of FIGS. 11 and 12. Then, the header object parser 52 sends the determined optimal program code from the program code storage unit 23 to the host device 4 via the communications controller 24, the communications network 3, and the communications controller 15.

In the host device 4, under the control of the CPU 18 and the controller 14, the program code uploader 42 causes the optimal program code sent from the target device 5 to be uploaded for storage in the ROM 16.

As described above, according to the device control system of the fifth embodiment, a plurality of pieces of program code are provided in advance to the target device. Of these pieces of program code, the target device determines optimal program code suitable for the system environment of the host device and the free space of the memory area thereof. Based on the determination result, the host device then automatically uploads the determined program code. With this, not only high-spec devices, such as television receivers or STBs, but also low-spec devices, such as PDAs or cellular phones, can be utilized as a host device. Also, a function for determining program code is not required at the host device side. Therefore, cost reduction of the host device can be achieved.

In the fifth embodiment, descriptions have been made by applying a scheme, in which the target device side checks the system environment of the host device to determine optimal program code, to the device control system according the first embodiment. This is not meant to be restrictive. The above scheme can be applied to the device control systems according to the second through fourth embodiments.

Furthermore, in the above first through fifth embodiments, each device connected via a communications network is predetermined as either one of a host device and a target device. However, each device can serve as both a host device and a target device as long as each device is provided with functions for serving as both a host device and a target device.

Typically, each function of the device control systems according to the first through fifth embodiments is achieved by predetermined program data that enables execution of the above-described procedures stored in a storage unit (ROM, RAM, hard disk, or the like) being executed by a CPU. In this case, the program data may be stored in the storage unit from a storage medium, such as CD-ROM or a flexible disk, or may be directly executed from such a storage medium.

While the invention has been described in detail, the foregoing description is in all aspects illustrative and not restrictive. It is understood that numerous other modifications and variations can be devised without departing from the scope of the invention.

What is claimed is:

1. A device control system in which at least one host device and at least one target device are connected to each other via a communications network,
the target device including:
a storage unit operable to store a plurality of pieces of program code required for control of the target device; and
a managing unit operable to manage program code information associated with the pieces of program code, wherein
the pieces of program code stored in the storage unit correspond to possible system environments of the host device, and two or more pieces of program code of different data sizes correspond to at least one of the possible system environments, and
the host device including:
an obtaining unit operable to obtain the program code information from the target device;
a predetermined memory area operable to store one of the pieces of program code;
an information parser for checking a system environment of the host device and a free space in the memory area, parsing the program code information, and determining, from out of the pieces of program code stored in the target device, a piece of program code that is suitable for the system environment and is storable in the memory area;
a reading unit operable to read the piece of program code determined by the information parser from the target device, and to cause the read piece of program code to be stored in the memory area; and
a controller for controlling the target device by using the piece of program code stored in the memory area.

2. The device control system according to claim 1, wherein
a plurality of said host devices include a host device serving as a main host device operable to control at least an arbitrary one of a plurality of said target devices, and further include at least one host device connected to the target device to be controlled via the communications network,
the information parser is operable to check memory areas of the plurality of said host devices excluding the main host device,
the information parser of the main host device first checks the memory area of the at least one host device connected to the target device to determine whether any of the at least one host device connected to the target device stores at least one piece of program code that corresponds to the system environment of the main host device, and designates any of the at least one host device connected to the target device found to store at least one piece of program code that corresponds to the system environment of the main host device as a first sub-host device, and
the information parser of the main host device designates, as the piece of program code that is suitable for the system environment of the main host device, a unique piece of program code that is determined based on the at least one piece of program code stored in the memory area of the first sub-host device.

3. The device control system according to claim 1, wherein
a plurality of said host devices include a host device serving as a main host device operable to control at least an arbitrary one of a plurality of said target devices, and further include at least one host device connected to the target device to be controlled via the communications network,
the information parser is operable to check memory areas of the plurality of said host devices excluding the main host device,
the controller further obtains command information enabling an operation of a piece of program code stored in any of the at least one host device connected to the target device and to give a command based on the command information, and
in the main host device,
when the pieces of program code stored in the target device do not include a piece of program code that is suitable for the system environment of the main host device and is storable in a memory area of the main host device, the information parser further checks the memory area of any of the at least one host device connected to the target device to determine whether any of the at least one host device connected to the target device stores at least one piece of program code that corresponds to the system environment of the main host device, and designates any of the at least one host device found to store at least one piece of program code that corresponds to the system environment of the main host device as a first sub-host device, and
the controller obtains the command information from the first sub-host device and gives the command to the first sub-host device based on the command information, and
in response to the command given by the main host device, the controller of the first sub-host device controls the target device by using the piece of program code stored in a memory area of the first sub-host device.

4. The device control system according to claim 3, wherein
in accordance with a determination by the information parser that any of the at least one host device connected to the target device does not store at least one piece of program code that corresponds to the system environment of the main host device,
in the main host device,
the information parser checks a free space of the memory area of the at least one host device connected to the target device to determine whether any of the at least one host device connected to the target device has a memory area in which at least one piece of program code that corresponds to the system environment of the main host device is storable, and designates any of the at least one host device connected to the target device found to have the memory area in which at least one host device connected to the target device as a second sub-host device,
the information parser further designates, as the piece of program code that is suitable for the system environment of the main host device, a piece of program code that corresponds to the system environment of the main host device and is storable in the memory area of the second sub-host device, and
the reading unit gives the second sub-host device an instruction of reading the piece of program code designated by the information parser,
in response to the instruction given by the main host device, the reading unit of the second sub-host device reads the designated piece of program code from the target device, and stores the read piece of program code in the memory area of the second sub-host device, the controller of the main host device obtains command information from the second sub-host device, and gives a command to the second sub-host device based on the command information, and in response to the command given by the main host device, the controller of the second sub-host device controls the target device by using the piece of program code stored in the memory area of the second sub-host device.

5. The device control system according to claim 1, wherein the possible system environments indicate virtual machines installable in the host device, and the pieces of program code and the program code information are generated based on types of the virtual machines.

6. The device control system according to claim 1, wherein the possible system environments indicate possible device specs of the host device, and the pieces of program code and the program code information are generated based on the possible device specs.

7. The device control system according to claim 6, wherein the host device further includes an input unit operable to enable a user to set a condition, and when the user sets the condition by using the input unit, the information parser determines a piece of program code suitable for device specs of the host device and best matching the condition.

8. A device control system in which at least one host device and at least one target device are connected to each other via a communications network, the target device including:
  a storage unit operable to store a plurality of pieces of program code required for control of the target device;
  a managing unit operable to manage program code information associated with the pieces of program code;
  an obtaining unit operable to obtain, from the host device, device information of the host device including information associated with a system environment and a free space of a predetermined memory area;
  an information parser for parsing the device information and the program code information, and determining, from out of the pieces of program code, a piece of program code that is suitable for the system environment of the host device and is storable in the memory area of the host device; and
  a reporting unit operable to report the piece of program code determined by the information parser to the host device, wherein the pieces of program code stored in the storage unit correspond to possible system environments of the host device, and two or more pieces of program code of different data sizes correspond to at least one of the possible system environments, and the host device including:
  an information managing unit operable to manage the device information;
  a reading unit operable to read the piece of program code reported by the reporting unit from the target device, and to cause the read piece of program code to be stored in the memory area; and
  a controller for controlling the target device by using the piece of program code stored in the memory area.

9. The device control system according to claim 8, wherein the possible system environments indicate virtual machines installable in the host device, and the pieces of program code and the program code information are generated based on types of the virtual machines.

10. The device control system according to claim 8, wherein the possible system environments indicate possible device specs of the host device, and the pieces of program code and the program code information are generated based on the possible device specs.

11. The device control system according to claim 10, wherein the host device further includes an input unit operable to enable a user to add a condition to the device information, and when the device information includes the condition set by the user, the information parser determines a piece of program code suitable for device specs of the host device and best matching the condition.

12. A network constructed by at least one device control system in which a plurality of devices are connected to each other via a communications network, wherein each of the plurality of devices is operable to serve as a host device operable to control another one of the devices and as a target device to be controlled by another one of the devices, each of the devices includes, as the target device:
  a storage unit operable to store a plurality of pieces of program code required for control of the target device; and
  a managing unit operable to manage program code information associated with the pieces of program code, wherein the pieces of program code stored in the storage unit correspond to possible system environments of the host device, and two or more pieces of program code of different data sizes correspond to at least one of the possible system environments, and each of the devices includes, as the host device:
  an obtaining unit operable to obtain the program code information from the target device;
  a predetermined memory area operable to store one of the pieces of program code;
  an information parser for checking a system environment of the host device and a free space in the memory area, parsing the program code information, and determining, from out of the pieces of program code stored in the target device, a piece of program code that is suitable for the system environment and is storable in the memory area;
  a reading unit operable to read the piece of program code determined by the information parser from the target device, and to cause the read piece of program code to be stored in the memory area; and
  a controller for controlling the target device by using the piece of program code stored in the memory area.

13. A network constructed by at least one device control system in which a plurality of devices are connected to each other via a communications network, wherein each of the plurality of devices is operable to serve as a host device operable to control another one of the devices and as a target device to be controlled by another one of the devices, each of the devices includes, as the target device:
- a storage unit operable to store a plurality of pieces of program code required for control of the target device;
- a managing unit operable to manage program code information associated with the pieces of program code;
- an obtaining unit operable to obtain, from the host device, device information of the host device including information associated with a system environment and a free space of a memory area;
- an information parser for parsing the device information and the program code information, and determining, from out of the pieces of program code, a piece of program code that is suitable for the system environment of the host device and is storable in the memory area of the host device; and
- a reporting unit operable to report the piece of program code determined by the information parser to the host device, wherein the pieces of program code stored in the storage unit correspond to possible system environments of the host device, and two or more pieces of program code of different data sizes correspond to at least one of the possible system environments, and each of the devices includes, as the host device:
- an information managing unit operable to manage the device information;
- a reading unit operable to read the piece of program code reported by the reporting unit from the target device, and to cause the read piece of program code to be stored in the memory area; and
- a controller for controlling the target device by using the piece of program code stored in the memory area.

14. A program executed on a main host device which is included in a plurality of host devices and is operable to control a target device via a communications network, the target device being operable to store a plurality of pieces of program code required for control of the target device and program code information associated with the pieces of program code, wherein the pieces of program code correspond to possible system environments of each of the host devices, and wherein two or more pieces of program code of different data sizes correspond to at least one of the possible system environments, the program comprising:
- a first obtaining step of obtaining the program code information from the target device;
- a first determining step of determining a system environment of the main host device and a free space of a predetermined memory area of the main host device;
- a step of parsing the program code information;
- a program code determining step of determining, based on the determination result in the first determining step and the parse result in the parsing step, from out of the pieces of program code stored in the target device, a piece of program code that is suitable for the system environment of the main host device and is storable in the memory area of the main host device;
- a first storing step of reading the determined piece of program code from the target device, and causing the read piece of program code to be stored in the memory area of the main host device; and
- a first controlling step of controlling the target device by using the stored piece of program code.

15. The program according to claim 14, further comprising
- a second determining step of checking a predetermined memory area of any of the host devices connected via the communications network to determine whether any of the host devices connected via the communications network stores at least one piece of program code that corresponds to the system environment of the main host device, and designating any of the host devices found to store at least one piece of program code that corresponds to the system environment of the main host device as a sub-host device, wherein the program code determining step designates, as the piece of program code that is suitable for the system environment of the main host device, a unique piece of program code that is determined based on the at least one piece of program code stored in the memory area of the sub-host device.

16. The program according to claim 14, further comprising:
- a second determining step of checking, in accordance with a determination in the program code determining step that the pieces of program code do not include a piece of program code that is suitable for the system environment of the main host device, a predetermined memory area of any of the host devices connected via the communications network to determine whether any of the host devices stores at least one piece of program code that corresponds to the system environment of the main host device, and designating any of the host devices found to store at least one piece of program code that corresponds to the system environment of the main host device as a sub-host device;
- a second obtaining step of obtaining command information which enables an operation of the stored piece of program code from the sub-host device; and
- a second controlling step of controlling the target device by giving a command to the sub-host device based on the command information.

17. The program according to claim 16, further comprising:
- a third determining step of checking, in accordance with a determination in the second determining step that any of the host devices connected to the target device does not store at least one piece of program code that corresponds to the system environment of the main host device, a free space of the memory area of the host devices connected to the target device to determine whether any of the host devices connected to the target device has a memory area in which at least one piece of program code that corresponds to the system environment of the main host device is storable, and designating any of the host devices connected to the target device found to have the memory area in which at least one piece of program code that corresponds to the system environment of the main host device is storable as a sub-host device;
- a second storing step of reading, from the target device, the piece of program code that is suitable for the system environment of the main host device, and causing the read piece of program code to be stored in a memory area of in the sub-host device;
- a third obtaining step of obtaining command information from the sub-host device; and a third controlling step of controlling the target device by giving a command to the sub-host device based on the command information.

18. A program executed on a target device that is controlled by a host device via a communications network, wherein the host device stores device information including information associated with a system environment and a free space of a predetermined memory area of the host device, wherein the target device is operable to store a plurality of pieces of program code required for control of the target device and program code information associated with the pieces of program code, wherein the pieces of program code correspond to possible system environments of each of the host devices, and wherein two or more pieces of program code of different data sizes correspond to at least one of the possible system environments, the program comprising:

a step of obtaining the device information from the host device;

a step of parsing the device information and the program code information;

a step of determining, based on the parse result in the parsing step, from out of the pieces of program code stored in the target device, a piece of program code that is suitable for the system environment of the host device and is storable in the memory area of the host device; and a step of sending the determined piece of program code to the host device.

* * * * *